United States Patent [19]

Garber

[11] Patent Number: 5,063,499

[45] Date of Patent: Nov. 5, 1991

[54] METHOD FOR CREATING VIRTUAL MEMORY SYSTEM BY REDIRECTING ACCESS FOR USER STACK INSTEAD OF SUPERVISOR STACK DURING NORMAL SUPERVISOR MODE PROCESSING

[75] Inventor: Jonathan F. Garber, Oakland, Calif.

[73] Assignee: Connectix, Inc., Menlo Park, Calif.

[21] Appl. No.: 294,831

[22] Filed: Jan. 9, 1989

[51] Int. Cl.[5] ............................................. G06F 12/02
[52] U.S. Cl. ................................ 395/500; 364/244.3; 364/246.11; 364/254.8; 364/261; 364/DIG. 1
[58] Field of Search ... 364/200 MS File, 900 MS File

[56] References Cited

U.S. PATENT DOCUMENTS

| | | | |
|---|---|---|---|
| 3,815,103 | 6/1974 | Holtey et al. | 364/200 |
| 4,493,035 | 1/1985 | MacGregor et al. | 364/200 |
| 4,519,032 | 5/1985 | Mendell | 364/200 |
| 4,528,624 | 7/1985 | Kamionka et al. | 364/200 |
| 4,542,458 | 9/1985 | Kitajima et al. | 364/200 |
| 4,592,011 | 5/1986 | Mantellina et al. | 364/200 |
| 4,617,624 | 10/1986 | Goodman | 364/200 |
| 4,669,043 | 5/1987 | Kaplinsky | 364/200 |
| 4,714,993 | 12/1987 | Livingston et al. | 364/200 |
| 4,825,358 | 4/1989 | Letwin | 364/200 |
| 4,849,878 | 7/1989 | Roy | 364/200 |
| 4,868,738 | 9/1989 | Kish et al. | 364/200 |

OTHER PUBLICATIONS

"Editorial—'89 Won't be Apple's Year of Multitasking", MacWeek, Jan. 3, 1989 p. 22.
"Virtual Memory Ends RAM Jam", MacWeek, Jan. 10, 1989 p. 1.
"Latest—Virtual Memory Draws Nearer", MacWeek, Jan. 31, 1989 p. 1.
"First Look—Virtual 2.0 Beats Mac's 8M-Byte RAM Barrier", PC Week, Oct. 23, 1989, pp. 15, 18.
Designing Cards and Drivers for Macintosh II and Macintosh SE Apple Computer, Inc., Addison-Wesley Publishing Company, Inc. 1987; ISBN 0-201-19256-X (pp. 1-4 to 1-6).
Macintosh Family Hardware Reference Apple Computer, Inc., Addison-Wesley Publishing Company, Inc., 1988; ISBN 0-201-19255-1 (pp. 16-10 and 16-11).
MC68020 32-Bit Microprocessor User's Manual (Third Edition), Motorola, Inc., Prentice-Hall, Inc. 1984, 1985; ISBN 0-13-566951-0 (particularly Section 1.3).
"Eternal Ramdisk Program", Dec. 06, 1986, CompuServe Information Service.
Byte, Nov. 1989, pp. 341-360.
"Connectix's Virtual Memory Solution", Macintosh News, Jun. 5, 1989, p. 8.
"Mac the Knite"—"No field test for 3-slot '030box2", MacWeek, Nov. 29, 1988, p. 70.
MC68030 Enhanced 32-Bit Microprocessor User's Manual (Second Ed.) Motorola, Inc., Prentice-Hall, Inc., 1989, ISBN 0-13-566951-0 (pp. 1-1 to 1-12).
MC68851 Paged Memory Management Unit User's Manual; Motorola, Inc., Prentice-Hall, Inc. 1986 ISBN 0-13-566902-2 (particularly Chap. 2 and Appendix C).
MC68851 Paged Memory Management Unit User's Manual, Second Ed.; Motorola, Inc., Prentice-Hall, Inc., 1989, ISBN 0-13-566993-6 (as with the first edition, particularly Chap. 2 and Appendix C).
Operating Systems Design and Implementation, Andrew S. Tanenbaum, Prentice-Hall, Inc., 1987; ISBN 0-13-637406-9 (Chap. 4).

*Primary Examiner*—Thomas C. Lee
*Attorney, Agent, or Firm*—Harrison & Eaken

[57] ABSTRACT

A method for causing suitably configured versions of the Apple Macintosh computer running the Apple Macintosh operating system to operate in user mode while causing at least user programs to continue to perform as though operating in supervisor mode, and in conjunction therewith a further method for implementing virtual memory on such Apple Macintosh computer systems.

11 Claims, 10 Drawing Sheets

METHOD FOR CREATING A VIRTUAL MEMORY SYSTEM BY REDIRECTING ACCESS FOR USER STACK INSTEAD OF SUPERVISOR STACK DURING NORMAL SUPERVISOR MODE PROCESSING

FIELD OF THE INVENTION

This invention relates to virtual memory systems for computers, and more particularly relates to virtual memory systems for microprocessor-based computers using the Motorola 680X0 series microprocessor and the Apple Macintosh operating system.

BACKGROUND OF THE INVENTION

Virtual memory has long been known for use with mainframe computers and minicomputers. Virtual memory basically refers to a technique for combining a quantity of physical memory, typically provided by semiconductor chips such as DRAM, with a block of peripheral storage, which has in the past usually been magnetic media-based storage such as a hard disk, to give to the computer user the impression that the amount of physical RAM is actually larger than the available physical RAM.

The advantages of such techniques are well known in the art. Certain of these advantages are particularly noteworthy at present, including the substantial cost and relative unavailability of DRAM memory as compared to hard disk memory, as well as nominal space and power requirements, and nonvolatility.

A variety of virtual memory algorithms are known. Most use a memory management unit of some sort which maps a memory address in the virtual address space either to physical RAM or to the peripheral storage. One such algorithm is referred to as "paging", in which the virtual address space is divided into pages, and pages of information are swapped between the physical RAM and the peripheral storage. Various algorithms also exist for determining when best to make such a page swap. One common approach is to swap pages on demand.

Shown in FIG. 1a is a simplified prior art implementation of virtual memory. As can be seen, when the system detects an attempted access to a location of memory not resident in physical RAM, it saves the state of the processor on the stack, swaps in the page of virtual memory containing the necessary information, retrieves from the stack the state of the processor, and proceeds to execute the instruction that accessed the virtual space.

Although such virtual memory techniques are well known, such techniques generally have not been applied in the microcomputer-based, personal computer environment. Thus, for example, virtual memory has not been used in the Apple Macintosh/Macintosh SE/Macintosh II environment with the Macintosh operating system. These environments may, in general, be thought of as Motorola 68XXX-based microcomputers using the Apple Macintosh operating system. Other operating systems offered by Apple, for example A/UX, and certain other manufacturers, such as Sun Microsystems, for example, use different operating systems, for example UNIX, with the same classes of microprocessors and offer virtual memory in such different environments.

The Motorola 680X0 series of microprocessors are designed to have two modes of operation, usually referred to as supervisor mode and user mode. To implement virtual memory, user programs generally are not permitted to operate with the 680X0 microprocessor in supervisor mode. Instead, only the operating system and operating system calls may run the processor in supervisor mode, while user programs operate only in user mode.

A difficulty arises with the Apple Macintosh series of personal computers using 680X0 microprocessors, because the Macintosh operating system permits user programs to operate the 680X0 processor in supervisor mode. A key difficulty which results is that the user programs for the Macintosh computer, operating with the 680X0 processor in supervisor mode, may change the location of the supervisor stack. FIG. 1b is a simplified block diagram of the arrangement of physical memory in a conventional Apple Macintosh computer, showing the operating system zone at the lowest addresses in memory, followed by a zone of memory for application programs. Above the zone for application programs is a stack zone, which in conventional Apple Macintosh computers is a supervisor-mode stack zone. Finally, at the top of memory is a zone referred to as static memory, where application programs can reserve a specific portion of memory to store needed information, and the information in those addresses generally cannot be moved by other programs until the system is rebooted.

Since most, if not all, virtual memory systems save the state of thprocessor to a stack, permitting the user program to alter the location of the supervisor stack while at the same time trying to run virtual memory may mean that the supervisor stack is moved, by the user program in supervisor mode, to a location which the virtual memory system already has swapped out to disk. When an attempt is later made to save the processor state on the stack, the state of the processor is effectively lost, resulting in a fatal error.

Thus, while the Macintosh operating system has many attractive features, including a popular graphics capability and user-friendly interface, the limitations of the Apple Macintosh operating system have posed significant problems for users desiring more memory and the associated performance improvements. Thus, there has been a significant need for a virtual memory system which is transparent to the normal user of the Apple Macintosh operating system with Apple Macintosh computers using the 680X0 processor.

SUMMARY OF THE INvENTION

The present invention overcomes the limitations of the prior art by implementing a page-swapping virtual memory algorithm for the Apple MacIntosh series of computers having add-on or internal MMU functions and suitable disk space. The disk space, although typically a magnetic media hard disk, also can be provided by a floppy disk, tape drive, optical disk, or other suitable form of storage media.

Stated simplistically, the present invention fools the Apple Macintosh operating system into believing that the system and all applications running under the system are operating in supervisor mode. In fact, however, the system and the applications are operating at most times in user mode. In this manner, the stack address can be carefully controlled, and located where it will not be swapped out by the virtual memory algorithm. In this manner page swaps to the virtual address space can be readily performed for less critical information.

More specifically, the present invention interposes a software layer of virtual memory code between hardware and the operating system. The present invention therefore runs above the operating system and user programs. The process of the present invention then recognizes when the processor tries to execute an instruction not available in the unprivileged user mode, and performs a software emulation of that instruction. The emulation may either be a specially written emulator, such as might be desirable for certain common instructions, or execution of the instruction in supervisor mode under close scrutiny.

Additionally, the process of the present invention intercepts other operations which might corrupt the state of the stack pointer, and relocates to the appropriate new location, such as a user stack, the information sought by or left from those operations. In some situations, user programs may attempt to alter the addresses used to perform such intercepts. Such difficulties are avoided by forcing the routine to alter a different address, permitting the original vector exception table to be left intact. The appropriate jump may then be made after the process evaluates the requested exception.

To permit the present invention to be implemented on an Apple Macintosh II computer using a Motorola 68020 microprocessor, a memory management chip such as the Motorola 68851 PMMU must be added to the system. A socket for such a chip s provided on the currently available Macintosh II. Shown in FIG. 1c is a simplified hardware schematic showing the interposing of a PMMU chip between the 68020 CPU and memory such as is found in the Apple Macintosh II computers.

In addition, the process of the present invention operates Apple Macintosh computers using the Motorola 68030 microprocessor and running under the Macintosh operating system, since the 68030 internally provides the memory management features necessary for operation of the present invention.

To implement the present invention on existing models of the Macintosh line which use a 68000 processor, such as the Macintosh SE, Macintosh Plus, Macintosh 512E, and others, it is necessary to add a 680X0 processor other than a 68000. Numerous accelerator boards for these Macintosh computers offer just such capability, and use either a 68010, 68012, 68020 or 68030 processor as well as providing a slot for a Motorola 68851 MMU. As with the Macintosh II, an MMU must also be added (unless a 68030 processor is added) to permit the Macintosh SE and Plus computers to run the present invention.

It is therefore one object of the present invention to provide a process for implementing a virtual memory algorithm on an Apple Macintosh computer having a 680X0 processor and operating under the Macintosh operating system.

It is another object of the present invention to provide a process by which an Apple Macintosh computer operating in user mode under the Apple Macintosh operating system emulates an Apple Macintosh computer operating in supervisor mode under the Apple Macintosh operating system.

Still another object of the present invention is to provide a process by which instructions normally processed by an Apple Macintosh computer in supervisor mode can be emulated by an Apple Macintosh computer in user mode.

It is a further object of the present invention to provide a virtual memory system which is substantially transparent to the user of Apple Macintosh computers having 680X0 processors running under the Macintosh operating system.

It is a further object of the present invention to provide a virtual memory system capable of modifying the Apple Macintosh operating system to require user programs to operate with the 680X0 microprocessor in user mode as opposed to supervisor mode.

It is another object of the present invention to provide a process layered between the hardware and the operating system of the Macintosh computer which permits operation of a hard disk to provide virtual memory.

Another object of the present invention is to provide a method of warm booting a Macintosh computer running the Macintosh operating system which prevents resetting of a memory management unit and permits operation of a virtual memory algorithm.

It is yet another object of the present invention to provide a method for ensuring that no page fault occurs during time critical operations.

Still another object of the present invention is to provide a method partitioning I/O operations into blocks small enough to be processed in the amount of available physical memory.

A still further object of the present invention is to provide a method for performing an initialization which permits a virtual memory system to be automatically installed in an Apple Macintosh computer which permits slot devices and drivers to install in apparently normal fashion but within the virtual memory space.

These and other objects of the present invention will be more apparent from the following Detailed Description of the Invention, taken in conjunction with the FIGS. described below.

THE FIGURES

Figure 11A:
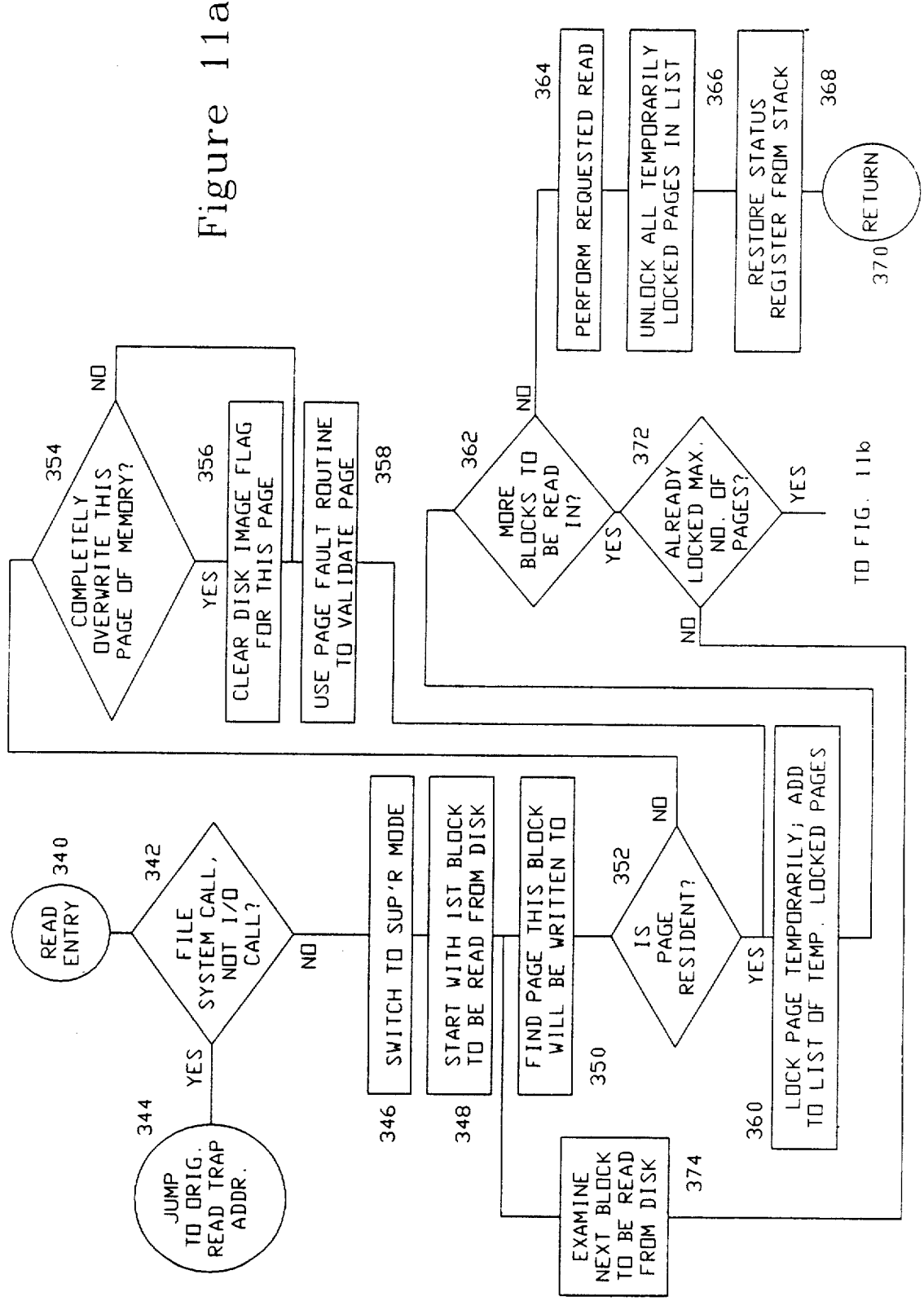
Figure 11B:
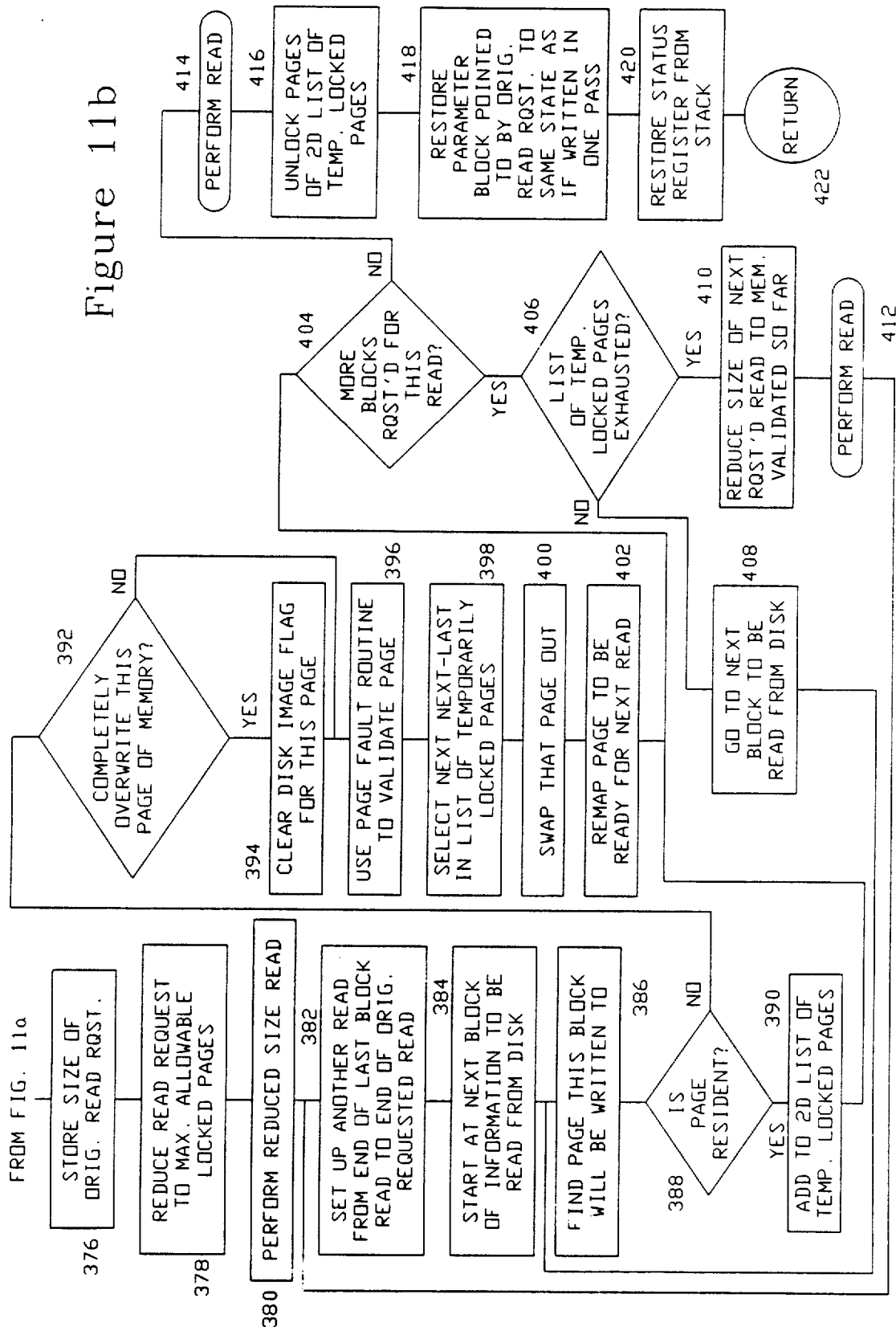

FIGS. 11a–11b, taken together, are a flow diagram showing a "read" optimization routine in the present invention for transferring information from the virtual address space to physical RAM in anticipation of need.

DETAILED DESCRIPTION OF THE INVENTION

The process of the present invention basically is comprised of several routines which cooperate to permit implementation of a virtual memory algorithm on a suitably configured Macintosh computer running under the Macintosh operating system. As noted above, a suitably configured Macintosh must include a 680X0 processor other than the 68000, MMU functions, and a suitable storage media such as a hard disk or other comparable device. With all but the 68030 processor, such MMU functions can be provided by adding a 68851 PMMU chip.

Figure 9:
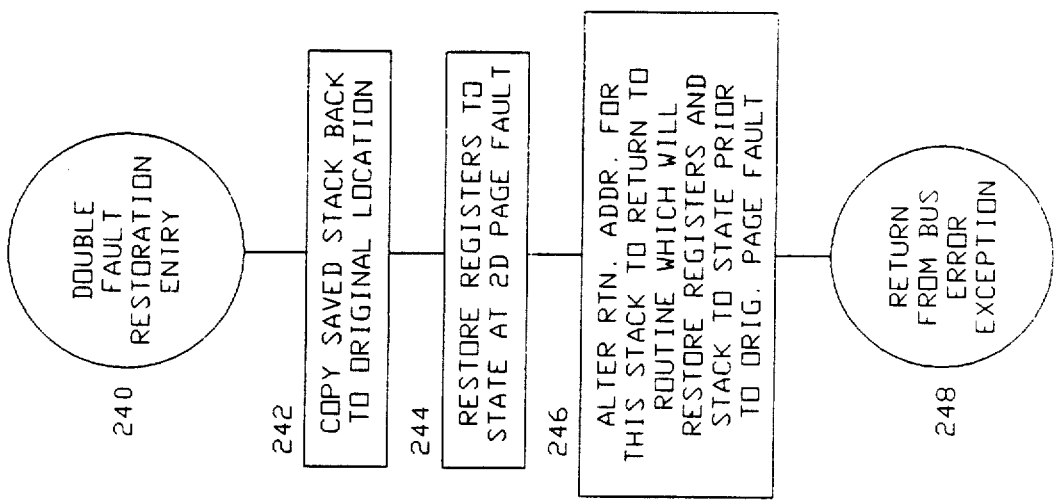
FIG. 9 is a flow diagram of the process of the present invention for permitting the system to handle "double page faults" which can occur when an interrupt generates a page fault while a page fault is already in progress.
Figure 7:
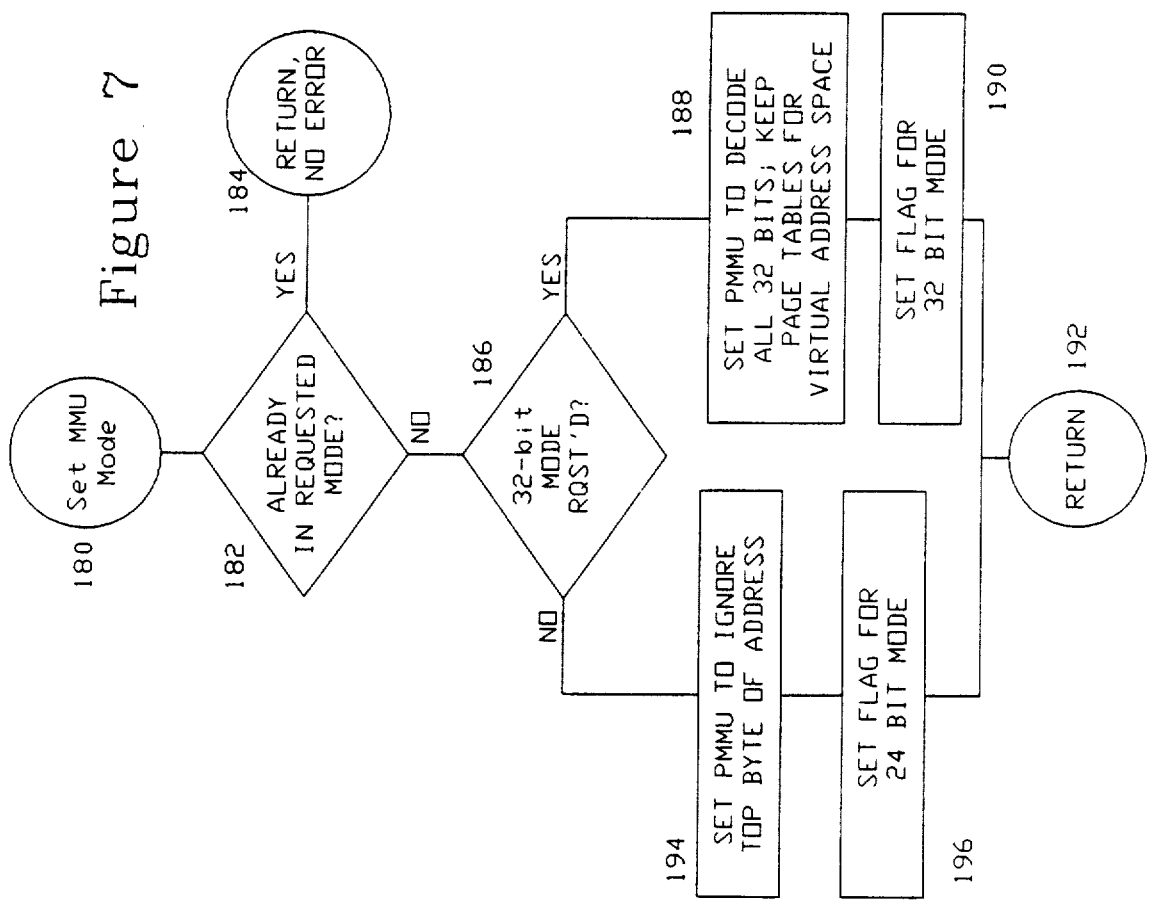
FIG. 7 is a flow diagram of the process of the present invention for permitting the Macintosh operating system and programs executing under it to run with virtual memory in 32-bit mode as well as 24-bit mode.

With the exception of the installation and page swap routines, each of these routines may generally be referred to as a "patch" which fixes a problem the Macintosh operating system trying to run a virtual memory algorithm would otherwise have. The routines which comprise the process of the present invention can generally be referred to as the INITIALIZATION ROUTINE (FIG. 2a), the RE-VECTORING PATCH (FIG. 3), the PRIVILEGE VIOLATION PATCH (FIG. 4), the TRACE PATCH (FIG. 5), the LINE 1010 VECTOR PATCH (FIG. 6), the SWAP MMU MODE PATCH (FIG. 7), the BUS ERROR VECTOR (FIGS. 8 and 9), the PAGE SELECTION ROUTINE (FIG. 10), the READ PATCH (FIGS. 11a–22b), and the WRITE PATCH, which is substantially identical to the READ PATCH.

INITIALIZATION ROUTINE

The INITIALIZATION ROUTINE, indicated generally at 10, is called at system startup by the Macintosh operating system. More specifically, the program by which the process of the present invention is implemented is copied into the system folder (or system directory) of the suitably configured Apple Macintosh computer. Then, on the next boot of the system, the program of the present invention is started by the system in the normal course of booting, as shown at step 10. The INITIALIZATION ROUTINE of the present invention thereupon checks, at step 20, to determine whether the proper hardware (a 68020 processor with a PMMU, a 68030, or other processor offering comparable functionality) and software (the Macintosh operating system or comparable) is present. If the proper hardware/software environment is not present, or upon user request, initialization is bypassed at step 14, typically without halting the system. The user may bypass installation by, for example, holding down the escape key during boot.

If the proper environment does exist, the initialization continues at step 16 by determining whether the software of the present invention has already been initialized once since power was turned on. This step is significant in the operation of the process of the present invention. Because the operating system loads into memory first at power up, the virtual memory process of the present invention initially runs under the operating system. By appropriate selection of the program name, such as by using a space as the initial character in the name, the process of the present invention will attempt to initialize, or install, immediately following boot by the operating system and prior to allowing other programs to initialize.

The software of the present invention installs itself by defining the virtual memory space and setting the PMMU and then, as will be discussed in greater detail hereinafter, restarts the operating system by a warm re-boot. The restart, or re-boot, is limited and is prohibited from incorrectly updating the values of the address at the top of memory, the buffer pointer address, or any part of the PMMU configuration registers. Since the virtual memory space and the critical memory settings are already defined, following the reboot the operating system runs in the virtual memory space set up by the first pass of the present invention, and runs under the present invention. The operating system then restarts the virtual memory process of the present invention, which detects that it has already initialized once since power up, and that the virtual memory space is available. The remainder of the installation can then be completed as discussed below. This "stutter start" technique (starting once normally, and then performing a controlled restart of the operating system under the virtual memory process) has been found to assist in providing a substantially transparent implementation of a virtual memory system on an Apple Macintosh II or similar computer.

Assuming the software implementing the present invention has not already been initialized, the process inquires at step 18 whether the virtual memory software has ever (not just on this pass) been installed on this machine before. If not, a virtual address space is allocated from the disk at step 20. In a preferred embodiment, the disk space allocated at step 20 is contiguous, although it is not necessary in all instances that the disk space be contiguous. In addition, with the present release of the Macintosh operating system, only eight megabytes of RAM can be recognized by the operating system, and thus only eight megabytes are allocated at step 20. However, it is anticipated that such limitations will be removed from the operating system, in which case step 20 may be readily modified to include selection of the amount of virtual memory space desired, which can then exceed eight megabytes. In addition, for performance reasons discussed below, the amount of disk space allocated is presently more than just the amount required to supplement the physical memory to eight megabytes, so that a copy of all data stored in physical RAM can also be maintained on disk. This increases performance by, among other things, avoiding the need to write to disk when swapping out unused pages.

Whether the allocation of disk space was successful is determined at step 22. If the allocation was not successful, installation is bypassed at step 24. However, in most cases where sufficient free hard disk space exists, the allocation will be successful. At this point, the disk space is allocated, which was the purpose of the installation inquiry at step 18, and so the two paths converge. Of course, even if the virtual memory system of the present invention has been installed on this machine before, if the previously allocated space has been corrupted or discarded since that installation, the present invention will simply proceed as though no prior installation had occurred.

Following successful allocation of the disk space, the code which implements the present invention is copied at step 26 from the disk to a known location in physical memory. In some embodiments it may be desirable to copy the code to a fixed location in physical memory, although this is not always necessary. At a later time, the locations holding this code can be remapped to the top (highest address) of logical memory and locked (made immune to page swapping, described in greater detail hereinafter) to ensure that no portion of the code is swapped out to disk. The process then determines how much physical RAM exists, and determines how much to emulate before reaching the current limit of eight megabytes noted above. Although the present version of the Macintosh OS includes an eight megabyte limit, step 28 may also include selection of the amount of memory to emulate. Once the eight megabyte limit of the operating system is removed, the user may then size the virtual memory in accordance with the available space on the hard disk.

Figure 1C:
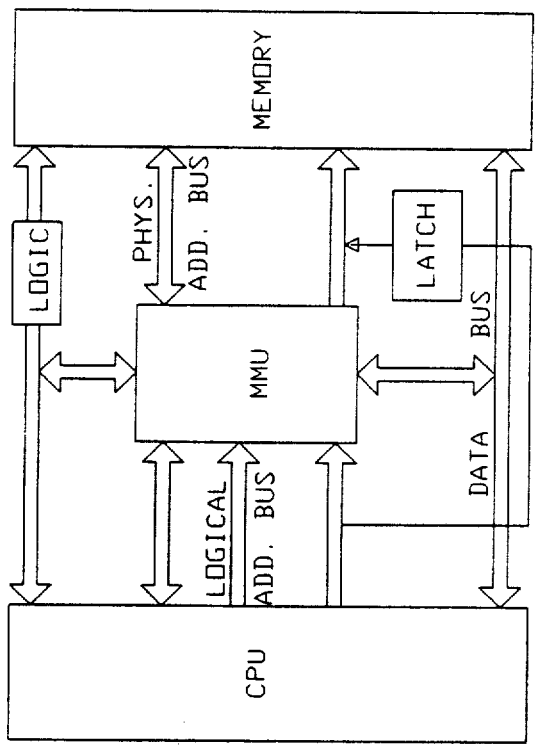
FIG. 1c is a prior art view of a computer system, such as the Apple Macintosh II, having a 68020 microprocessor, a 68851 MMU, and memory.
Figure 1A:
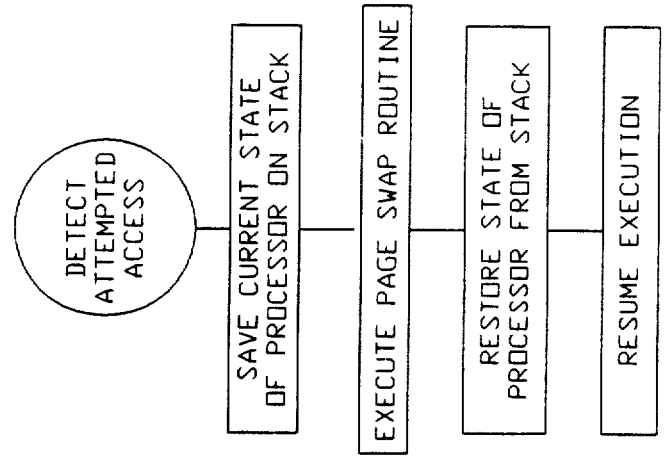
FIG. 1a is a simplified view of a prior art approach to virtual memory.

Following the determination of how much virtual memory will be created, page translation tables are created at step 30. In a typical embodiment, a single table entry is made for each page of virtual memory. The tables are used by the 68851 PMMU (FIG. 1c) to address the physical and disk based, or peripheral, portions of the virtual memory space. The tables are then initialized to recognize the existing amount of physical RAM, starting at address 0, followed by the allocated amount of disk-based virtual memory, starting with the next address following the physical RAM. Such disk-based virtual memory is alternatively referred to herein as "non-resident", or "paged out" memory.

Following creation of the page translation tables, a portion (for example, half or other suitable portion) of physical memory is typically remapped at step 32 to the top of the virtual address space. A logical zone for the startup system stack is then created by remapping a suitable number of pages [for example, on the order of four 2K byte pages mapped at the very top of the virtual address space, although the exact number of pages can be increased substantially to avoid any possible overflow] to a zone at the halfway point between logical address and the top of virtual memory. This complies with the manner in which the START MANAGER routine of the Macintosh OS (operating system) establishes the beginning location of the startup system stack. Numerous alternative approaches can be implemented for mapping and locating a startup system stack, as long as the logical address space which will hold the startup system stack is mapped to a location in physical memory, even though that location may change and may be unknown. The example described above is at present believed to provide good performance. An alternative technique, which would eliminate the requirement to map out a zone for the startup system stack (which is effectively the supervisor stack), is to perform the warm re-boot in user mode. Such an approach involves other complications, but does not require the stack integrity needed for operation in supervisor mode.

Following the re-mapping of step 32, the page map is altered at step 34 to map the virtual memory code to the top of the virtual memory address space. This can fill the space vacated by the memory taken to create a mapped zone for the startup system stack.

Once the page map is altered, certain frequently used pages of the system (and debugger, if any) are locked, or prevented from being swapped out to disk by the virtual memory algorithm described below, by setting an appropriate flag at step 36. It is not necessary in all cases to lock such pages, although such an approach is generally preferable to ensure critical pages are not swapped out to disk, to maintain diagnostic integrity (for debugging, if necessary), to maintain a zone of 1:1 logical to physical memory mapping for alternate bus masters, and to increase performance. The zone of 1:1 logical to physical mapping referred to above is typically on the order of 64K bytes, but could vary substantially.

Following the page locking of step 36, the portions of memory zoned for the system and static memory are assigned slow aging status at step 38. As will be discussed hereinafter, assignment of such status simplifies determination of pages which cannot be swapped out to disk. Next, at step 40, the bus error vector is pointed to the bus error routine, and the Swap MMU Mode routine (FIG. 7) is pointed to the new Swap MMU address. tables set up by steps 30–38 by using a call to the Swap MMU routine.

Finally, after the reconfiguring of step 42, a warm re-boot of the machine is performed at step 44. The warm boot uses the same boot code as the original code in the ROMs of the Macintosh computer, but is tailored to avoid any call which initializes or otherwise affects critical memory locations, such as the size and speed of memory (including MEMTOP) and the start of the static memory zone (BUFPTR), or the state of the PMMU, so that the installed virtual memory code will not be disturbed. The warm reboot allows slot drivers and device drivers to re-install in the virtual address space, rather than just in the physical address space, causing the system to appear as it would if the same amount of physical memory as virtual memory existed. During the course of the warm reboot process, the INIT (step lo) will again be entered.

Since this is a second pass installation, the decision at step 16 is yes, causing the process to branch to step 48. At step 48, the process opens the virtual memory file allocated during the first pass initialization, which prevents the user from throwing the virtual memory file away during normal operation. Then during step 50, the read and write trap calls are redirected to the custom routines described hereinafter.

At step 52, a new exception vector table is created in static memory and marked as protected, or immune from page swaps, and then initialized with all vectors in the table pointing to Re-Vectoring routine. Next, at step 54, the Bus Error, Privilege, Trace and Line 1010 vectors are patched to the routines in the new exception vector table. The Vector Base Register (VBR) is then pointed to the newly created vector table at step 56, and the user stack pointer is set to that stack's current value in step 58. In step 60, the supervisor stack pointer is set to a buffer protected from memory swaps to disk. Finally, at steps 62 and 64, the icon showing the loading of virtual memory is displayed and the processor is switched to user mode from supervisor mode. The system returns at step 66, ready to begin processing of user programs.

Figures 1B, 2B:
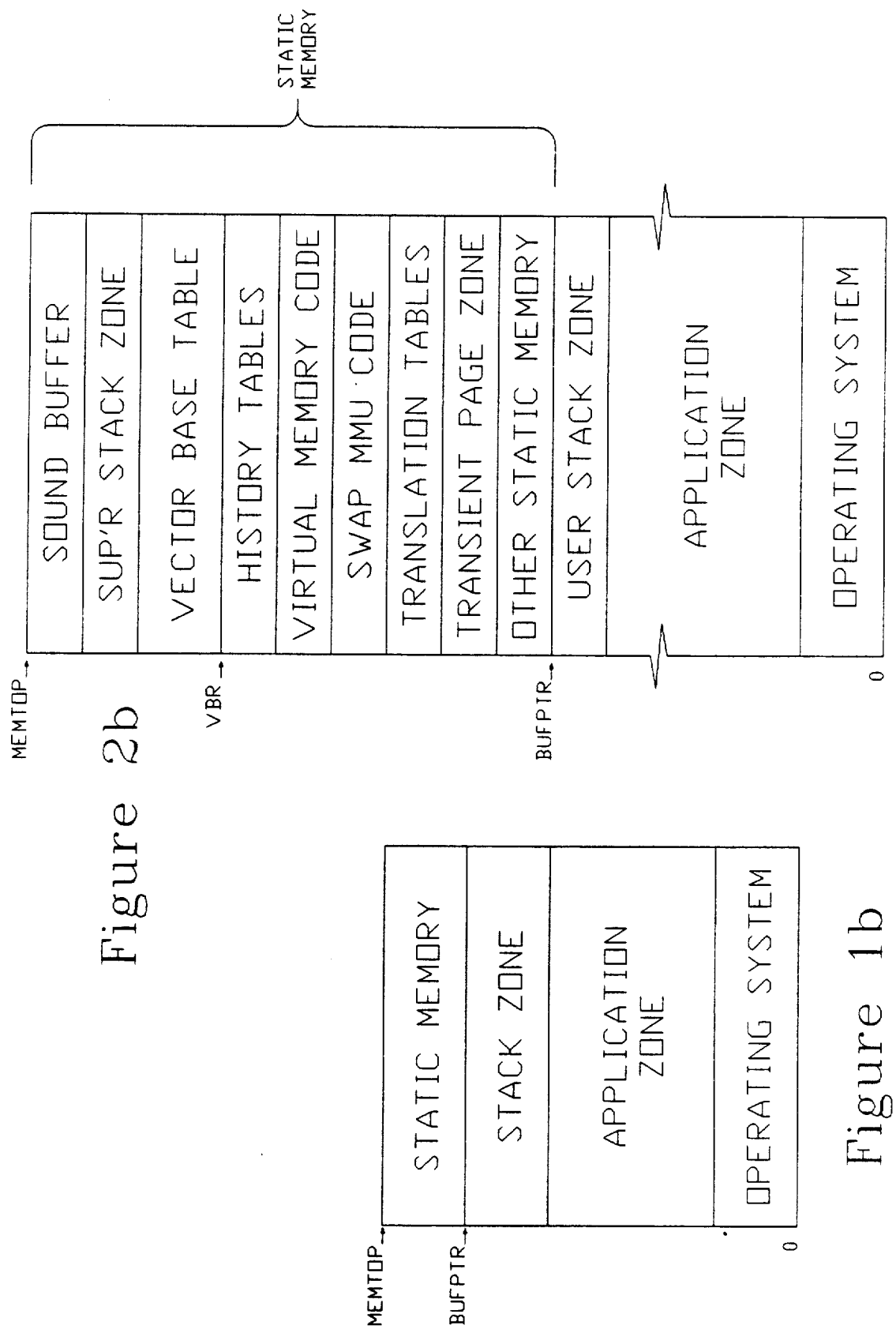
FIG. 1b is a prior art view, in block diagram form, of the memory arrangement of a Macintosh computer running the Macintosh operating system.
FIG. 2b is a block diagram view of the memory arrangement of a Macintosh computer running the present invention with the Macintosh operating system.
Figure 2A:
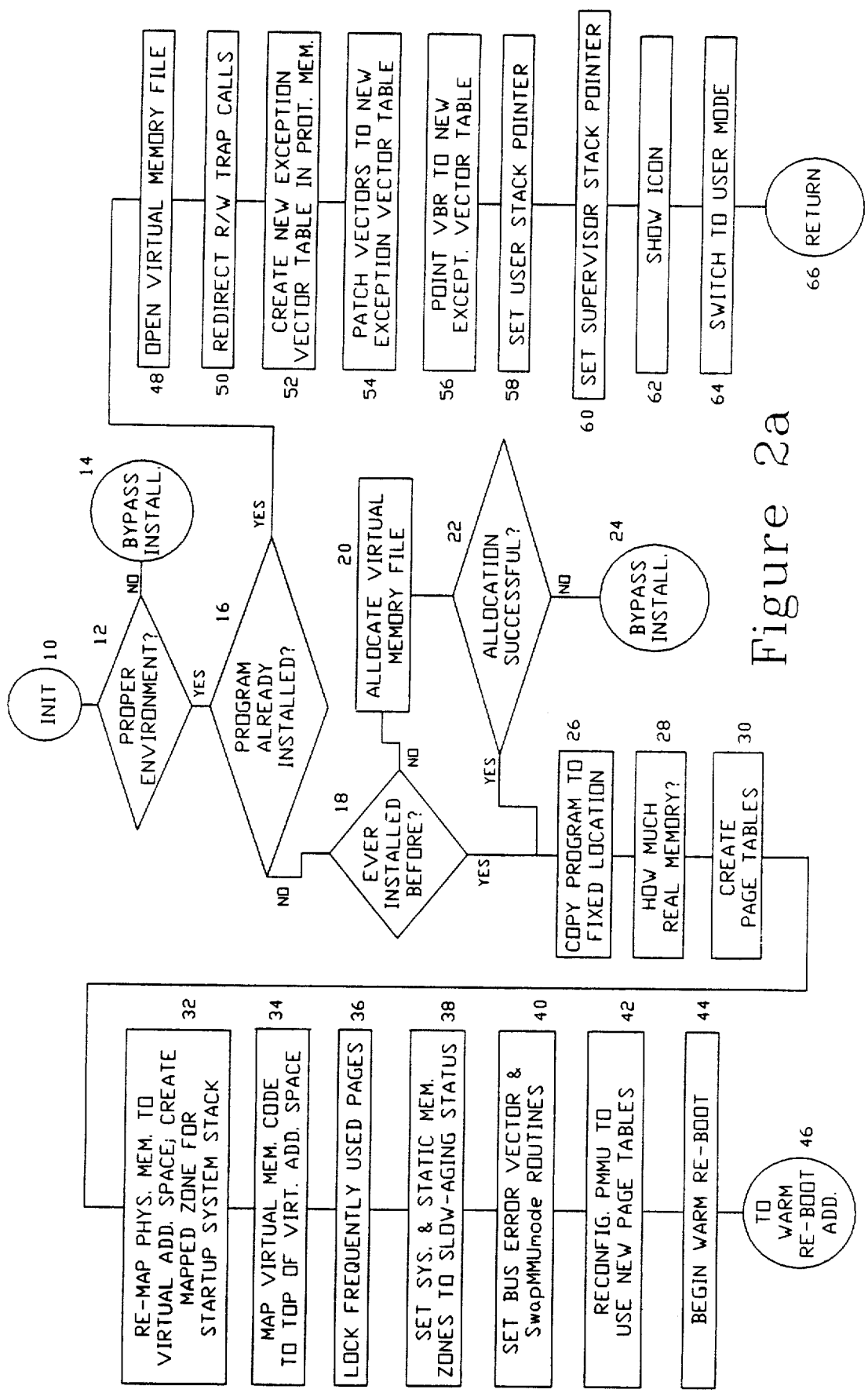
FIG. 2a is a flow diagram showing the installation of the process of the present invention upon initialization of a suitably configured Apple Macintosh computer system.

Once the code of the present invention has been installed, the logical architecture of memory is substantially as shown in FIG. 2b. The arrangement of FIG. 2b, which can be contrasted with the arrangement of conventional Apple Macintosh memory in FIG. 1b, continues to show the operating system installed in memory beginning at address 0. Above the operating system zone is the application zone, followed by a user stack zone. The user stack zone of FIG. 2b corresponds generally to the stack zone shown in FIG. 1b, since user programs under the present invention are permitted only to modify the user stack zone. Those of ordinary skill in the art will appreciate that some programs for the Apple Macintosh, such as MultiFinder, create a plurality of application zones and user stack zones within what has been referred to here as a single user stack zone and application zone. Above the user stack zone is static memory, but static memory now includes a zone for conventional static memory, together with specific portions of static memory assigned to perform particular virtual memory functions. Those functions include a supervisor stack zone, a vector base table (pointed to by the vector base register, or VBR, history tables, code for the virtual memory process of the present invention, and zones for the SWAP MMU process, translation tables and transient page storage, all as discussed hereinafter. The installation of the supervisor stack zone into static memory permits the supervisor stack zone to always be in a known location. The supervisor stack zone, which is typically a few thousand bytes, for example 8K bytes, but could range to on the order of 32K bytes, located in physical memory, although its logical address is very near to the top of memory. Those skilled in the art will appreciate that logical addresses need not map always to a physical address on a 1:1 basis.

Re-Vectoring Patch

Figure 3:
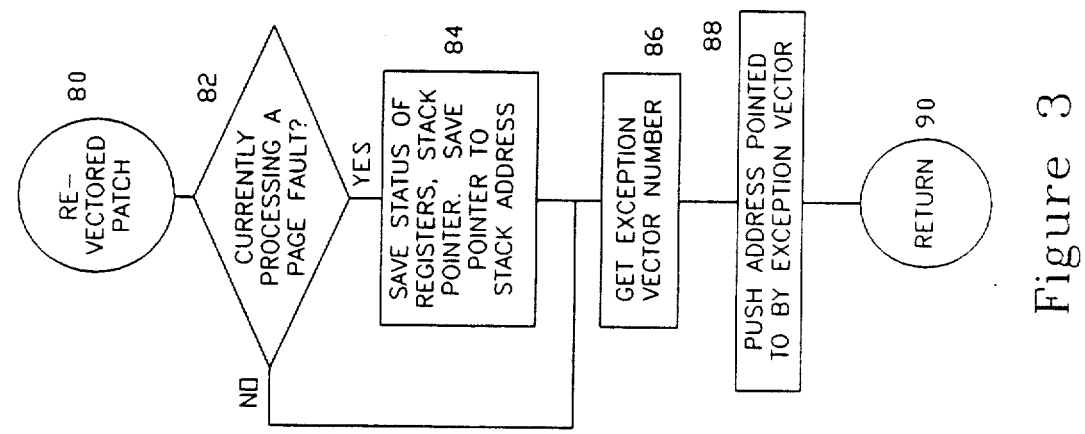
FIG. 3 is a flow diagram showing the process of the present invention by which exception vectors may be re-routed.

With reference now to FIG. 3, the flow diagram shown therein describes the redirection of the exception vectors not treated specifically hereinafter. Basically the approach taken by the routine shown in FIG. 3 is to receive the exception vector, look up the value of the address currently stored in the original vector table, and jump to the routine at that address. This leaves the stack unaltered from what it would have been if handled directly. Thus, programs can be fooled into not realizing the VBR has changed locations, while still being permitted to alter vector addresses in the original, zero-vector table. The programs can also affect where the exception will be processed, while leaving the supervisor stack protected. Optionally, to improve system performance, interrupts can be re-enabled during the page fault caused by the exception vector, after saving a copy of the registers and the stack pointer on the stack. Saving such additional information will permit handling of secondary page faults, as will be described in greater detail hereinafter.

In FIG. 3, when an exception vector is received, the routine is called up at step 80, and begins by determining at step 82 whether a page fault is currently being processed. If it is, a copy of the registers and the stack pointer is saved on the stack, and a pointer to the current stack address is saved in a static location, all at step 84. This permits interrupts to be re-enabled, which improves the apparent response of the system.

If no page fault was being processed at step 82, or following step 84 if a fault was being processed, the process continues at step 86 by obtaining the exception vector number from the exception stack frame. The current address pointed to by the exception vector number is then pushed on the stack in step 88, which permits execution to resume in step 90 at the original exception vector address. In this manner, the exception vectors set forth in Table above can be processed in essentially the same manner as for a non-virtual memory system.

Privilege Violation Vector

Figure 4:
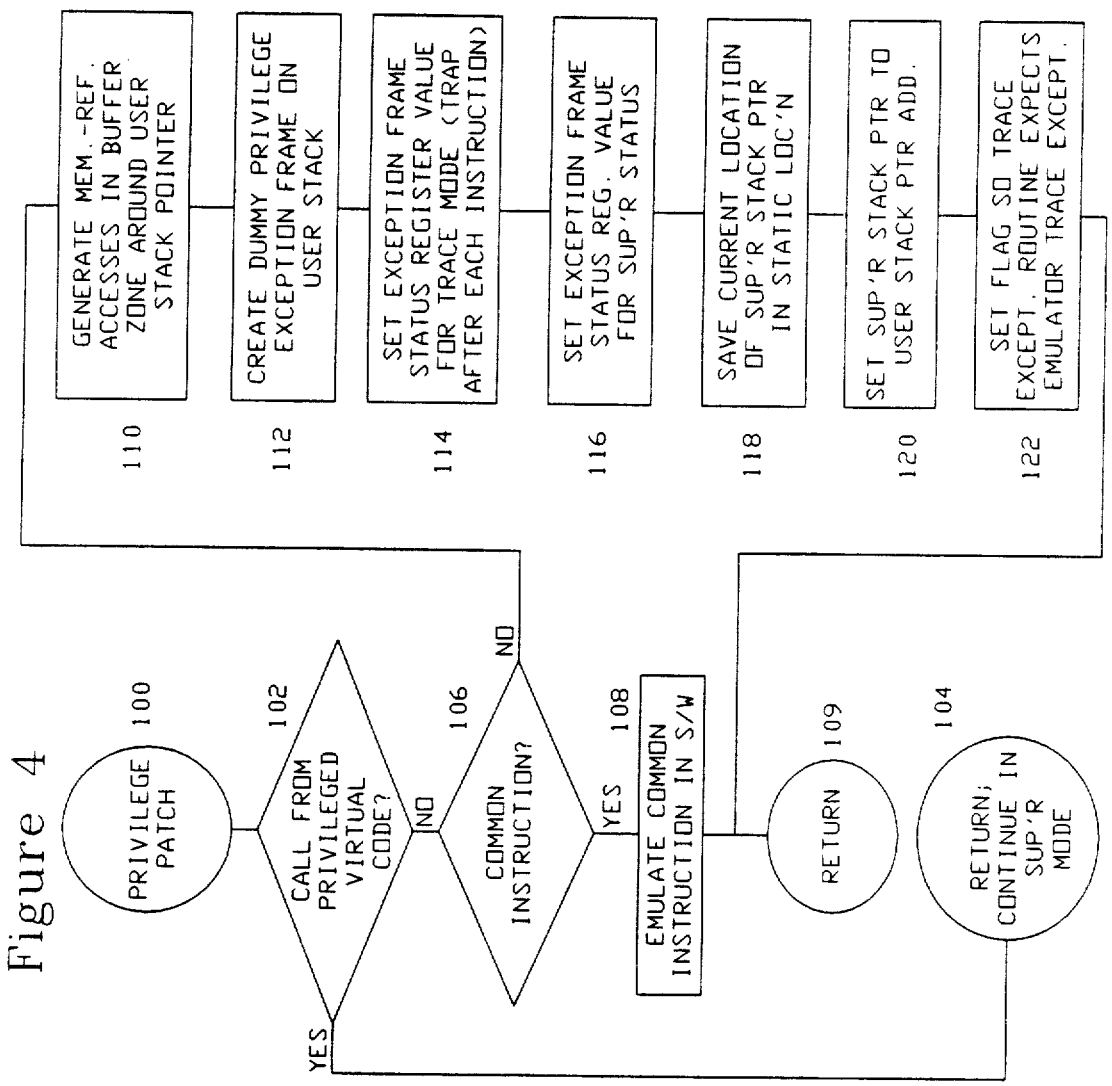
FIG. 4 is a flow diagram of the process of the present invention directed to emulating execution of privileged instructions.
Figure 5:
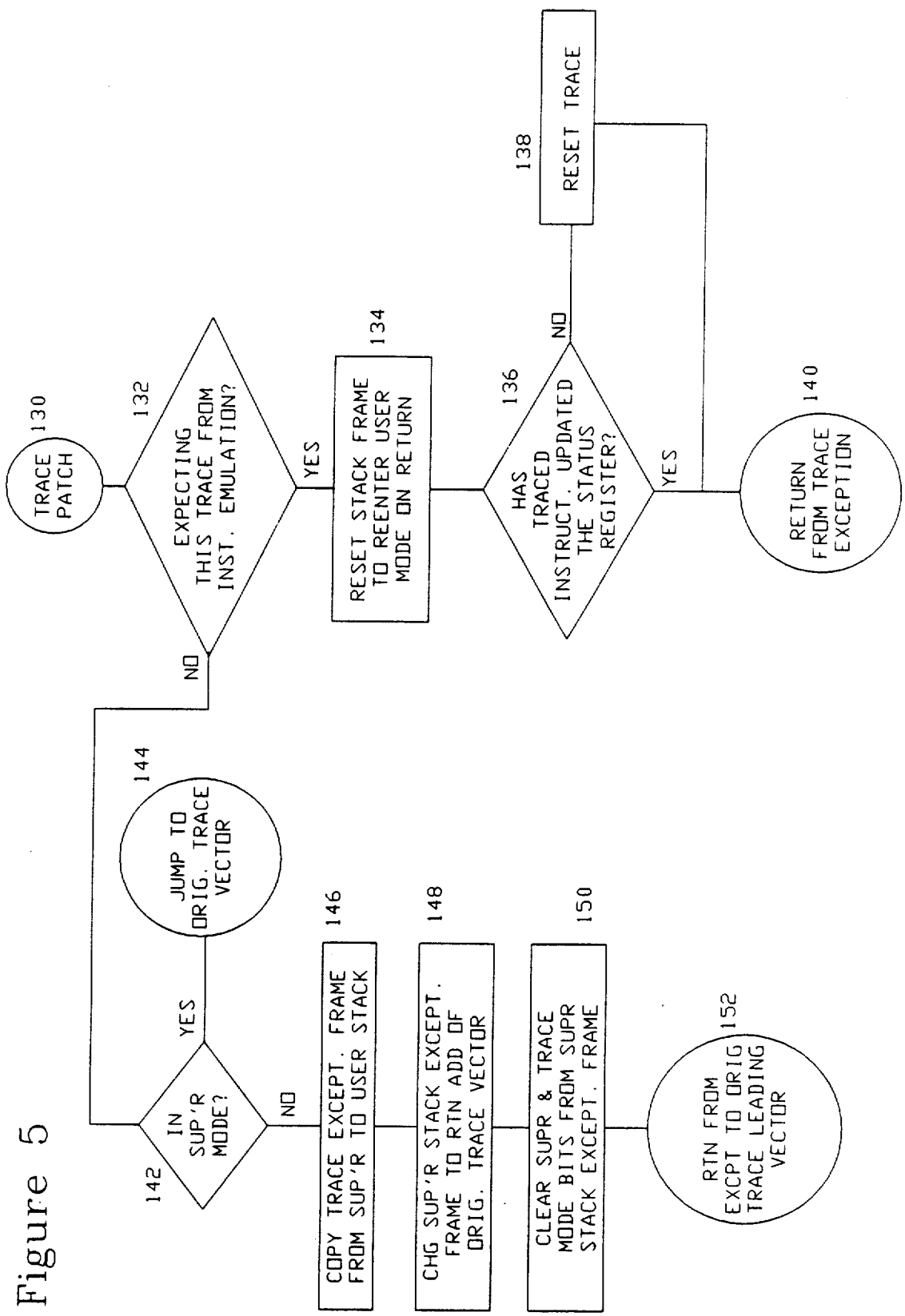
FIG. 5 is a flow diagram of the process of the present invention which permits certain privileged instructions to run in supervisor mode under close scutiny, or supervision.

With reference now to FIG. 4, a solution is shown for another type of problem with occur with a virtual memory system on the Macintosh system. Since the processor is now normally running the operating system and programs in user mode, while the operating system and programs expect to be running in supervisor mode, there will be some occasions in which the CPU will be instructed to execute supervisor-only, or "privileged" instructions. This causes a privilege violation, which typically can be handled in either of two ways. First, the instruction can be emulated in software so that the user program does not know the instruction was not actually executed. The second alternative is to permit the instruction to execute in supervisor mode only under careful supervision, and to then switch the system back to user mode. A combination of these approaches is shown in FIG. 4, in which instructions predefined as "common" be emulated, but other instructions are executed under careful supervision, typically through use of the TRACE instruction in the Macintosh operating system although other techniques are possible.

Thus, when the privilege error occurs, the privilege patch routine is called at step 100. If the privilege error results from a system call by specially authorized code segments, including code of the present invention, the process branches at step 102 to permit a return to the system at step 104, with the system continuing in supervisor mode.

However, if the call is not from the privileged virtual memory code of the present invention, an inquiry is then made at step 106 to determine whether the call causing the privilege error is a "common" instruction. Common instructions, which are herein intended to mean those which are frequently used and easily emulated, are then emulated in software at step 108, and the system returns from the privilege exception at step 109. Typical instructions which may be viewed as common are the move status register to A7 instruction (and its converse), and the change priority instruction. Other instructions, such as the stop instruction, any instruction which accesses or changes the address of the VBR, and the reset instruction are also defined as "common" even though they are infrequent, cannot readily be traced, or must provide different response in the emulated environment. For example, emulation of the stop instruction involves executing a very tight loop to give the appearance of a system halt, and cannot readily be performed under the supervision of the TRACE mode.

In the event the call which led to the privilege violation is not a "common" instruction, the process branches to step 110, where memory-reference accesses are generated in a buffer zone around the user stack pointer. The creation of such a buffer zone ensures that the memory around the user stack pointer is not currently paged out by causing a page fault if the zone is swapped out. If such a page fault occurs, the page will be reloaded, so that as long as the stack pointer points to any location in the buffer zone, the corresponding page should be resident.

Following step 110, a dummy privilege exception frame is created on the user stack at step 112, followed further at step 114 by setting the exception frame status register value to trap after each instruction. Such trapping may also be referred to as "trace", and may be thought of as step-by-step supervision of the execution. Next, at step 116, the exception frame status register value is set for supervisor status. This is followed by saving, at step 118, the current location of the supervisor stack pointer in a static location and setting the supervisor stack pointer to the user stack pointer address at step 120. Finally, a flat is set at step 122 so that the trace exception routine knows to expect a trace exception from the instruction emulator. The process thus permits certain privileged instructions to execute in supervisor mode while at the same time protecting the pointers necessary for virtual memory. Once the instruction completes processing, the routine returns from the exception at step 109.

Trace Patch

As discussed above, in the preferred embodiment of the present invention, use of the TRACE instruction is helpful to emulate certain types of instructions which create a privilege violation. Other instruction emulation techniques could readily be used. In this preferred approach, however, it is necessary to trace, or supervise on a step-by-step basis, the execution of some of the system calls to avoid corruption of the stack. The trace patch, shown in FIG. 5, will permit such supervision, and used to allow execution of calls that cannot be easily emulated, or are not yet known to exist. In such event, the trace patch is called at step 130, and begins at step 132 by inquiring whether the trace was expected from an instruction emulation. If so, the process branches to step 134 so the processor mode will be reset to user mode upon return from this exception. Following the reset, the routine determines at step 136 whether the user program has independently updated the status register. If not, the trace bit is reset at step 138, and the routine returns from the exception at step 140. The routine then returns from the trace exception, again at step 140. Thus, the instruction is allowed to execute in supervisor mode under scrutiny, the trace routine is then switched back out of supervisor mode, and the processor is allowed to continue with other instructions in user mode.

However, if no trace was expected at step 132 from the instruction emulation, the routine branches to step 142, where the routine inquires whether the system is in supervisor mode. If so, the routine jumps to the original trace vector at step 144. If not, the routine branches to step 146, where the trace exception frame is copied from the supervisor stack to the user stack. The supervisor stack exception frame is then changed in step 148 to the return address of the original trace vector, followed in step 150 by clearing the supervisor and trace mode bits from the supervisor stack exception frame. Once this is complete, the routine returns from the exception to the original trace vector at step 152.

Line 1010 Vector Patch

Many operating systems for 68XXX-based machines, such as the Macintosh, use line 1010 traps, or "A" traps, to handle system calls. Generally, the application desiring to execute such a system call will set up either registers or the stack with the calling parameters, and then execute an instruction beginning "1010". The 1010 instruction in turn causes an exception to be generated to the "un-implemented instruction" exception vector, which effectively extends the instruction set of the processor by causing the operating system to evaluate the instruction and generate the desired effects in software. However, such exceptions cause a transition from user mode to supervisor mode, even though the user programs which made the call are operating in user mode with the user stack rather than the supervisor stack. Thus, when such a call is made, it is necessary to substitute the appropriate stack pointer to ensure that the pointer used by the system call is the same stack to which the parameters were originally passed.

Figure 6:
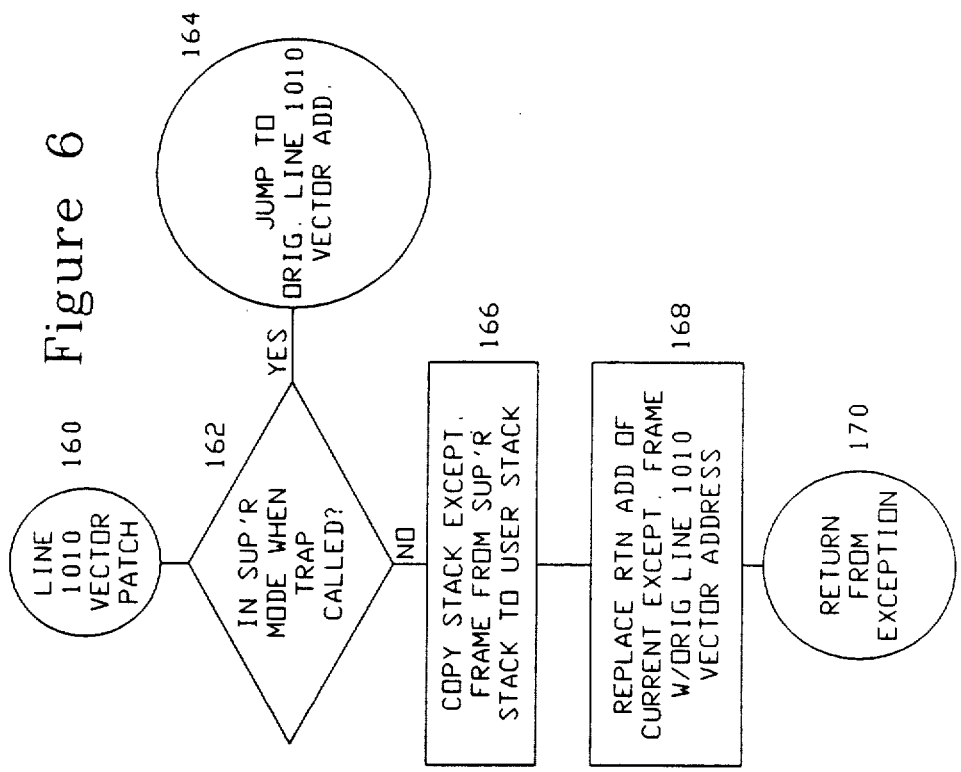
FIG. 6 is a flow diagram of the process of the present invention directed to handling unimplemented instruction traps, referred to as line 1010 system calls, within the Macintosh operating system.

This is accomplished by the routine described in FIG. 6, where the line 1010 vector patch is called at step 160. The routine begins by inquiring, at step 162, whether the system was in supervisor mode when the trap was called. If so, the routine jumps at step 164 to the original line 1010 vector address, taken from the original zero-base vector table.

If not, however, the routine branches to step 166, and copies the stack exception frame from the supervisor stack to the user stack. Next, at step 168, the return address of the current exception frame is replaced with the original line 1010 vector address, so that when the return from the exception is made, execution will continue with the appropriate information supplied to the appropriate stack at step 170.

Sawp MMU Patch

Under the current Maointosh operating system, there are two common modes of addressing. In twenty-four bit mode, only the least significant 24 bits are ordinarily recognized. However, in some cases with the current operating system all 32 bits are used; presumably this trend will continue with future releases of the operating system, such that eventually all 32 bits will normally be used. When all 32 bits are used, it is necessary to alert the PMMU to fully decode the address, but to still point to the page translation tables set up by the virtual memory routines of the present invention. It is also necessary to be able to transfer back to 24 bit mode. This toggling can be accomplished by the routine shown in FIG. 7, which begins at step 180 by a call to the Set MMU Mode routine. The routine begins at step 182 by determining whether the system is already in the requested mode. If it is, the routine returns at step 184. However, if not, the routine inquires at step 186 whether 32-bit mode has been requested. If it has, the PMMU (shown in FIG. 1c) is set at step 188 to decode all 32 bits, but still uses the page translation tables to decode the physical address for any location in the virtual address space. A flag is then set at step 190 to indicate the current state is 32 bit mode, and the routine returns at step 192.

On the other hand, if the inquiry at step 186 determines 32-bit mode is not requested, the PMMU is set at step 194 to ignore the top byte, or top 8 bits, of the 32-bit address, and the corresponding flag is set at step 196. Again, the routine returns at step 192.

Bus Error Vector

When a memory location is called for, but is not immediately available for referencing, a bus error is generated. In such an instance, it is necessary to determine whether the location is unavailable because it has been paged out to disk; this can be accomplished by the routine shown in FIG. 8. The bus error vector is called at step 200, and begins at step 202 by saving the state of the registers and the PMMU, followed by determining the address and the cause of the bus error at step 204.

If, as determined at step 206, the bus error is not due to a page fault, the registers and PMMU setting are restored at step 208, and the routine jumps to the original bus error address vector at step 210. However, where the inquiry at step 206 determines that a page fault has occurred, the routine inquires at step 212 whether a page fault was already being corrected that is, the process of swapping information in from disk was already in progress) when this page fault occurred. If it was, it will simplify operations to finish correcting the first page fault before dealing with the second. This is accomplished in step 214 by saving, at a different location, a copy of the stack from where the new page fault occurred to the current stack pointer. Next, at step 216, the registers are restored to their state prior to the occurrence of the second page fault—that is, their status during the handling of the first page fault, which was saved at step 82 shown in FIG. 3. Then, at step 218, set the return address of the original page fault to resume execution at the double fault restoration routine shown in FIG. 9. The routine then preferably switches to a very high level of priority, so it will not again be interrupted by the process which caused the second page fault, and returns at step 220 to finish handling the first page fault.

Figure 10:
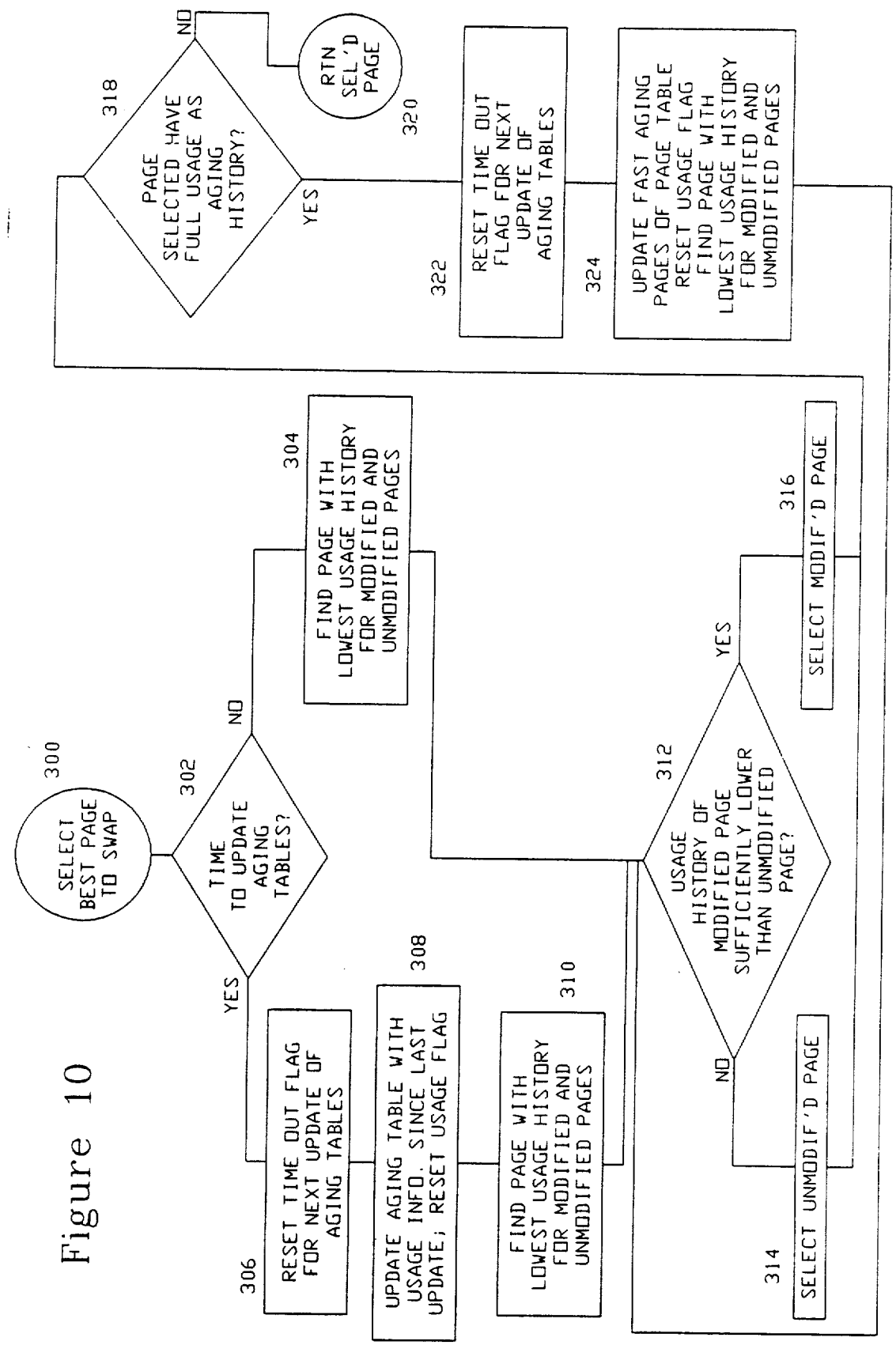
FIG. 10 is a flow diagram describing the process by which the present invention selects pages of physical RAM to be swapped out to disk.

If, as should usually be the case, there was no prior page fault being handled when the inquiry was made at step 212, the routine continues by selecting at step 222 a page not likely to be needed soon. While various algorithms exist for making this selection, one acceptable algorithm is shown in FIG. 10, which uses page usage history or aging tables. That page is then mapped out as non-resident, still at step 222. At step 224, a determination is made as to whether the page has been modified since the last time it was written out to disk. If it has, the page is written to disk at step 226, and a flag is set that the page now has a disk image.

An inquiry is made at step 228 as to whether the faulted page has a disk image. If it does, the disk image of the faulted page is read from disk at step 230 into the physical memory of the selected page, while the faulted page is temporarily mapped to an alternate location, which may be regarded as a transient page zone (FIG. 2b), and the page modified flag is cleared. The transient holding zone is used to prevent processing of incorrect code or data in the event an interrupt occurs which requires the use of code or data on the page before the code or data in that page can be fully updated from its disk image. If the answer to the inquiry at step 228 was no, or following the reading of the disk image in step 230, the routine advances to step 232 and remaps the now-restored faulted page to the address where the page fault was detected. Thereafter, in step 234, the registers and PMMU status are restored, and the routine returns in step 236.

If the inquiry at step 212 did not find a second page fault, the return at step 236 will simply return to the system. However, if a second page fault did exist, the return address supplied at step 236 will jump to the routine shown in FIG. 9 for double faults, so that the secondary fault(s) can now be handled. The routine is called at step 240, and begins at step 242 by copying the saved stack (caused by the second page fault) back to its original location. The registers are then restored in step 244 to their state at the time of the second page fault. Next, the return address for the stack is altered in step 246 to return to the routine to restore the registers and stack to the state they were in when the second page fault occurred. The system then resumes processing. If the page swap which solved the first page fault also solves the second page fault, no error will be reported. However, if the solution to the first fault does not solve the second page fault, the second page fault will recur. However, upon recurrence, it will be the first fault, and can be handled accordingly. The routine then returns at step 248 from the bus error exception.

Page Selection Routine

For any virtual memory system to work, it is sometimes necessary to retrieve pages of memory from disk. If physical RAM is full, as it presumably is, it is necessary to mark to disk, or page out, pages in physical memory to make room for the pages retrieved from disk. Various criteria can be implemented which will accomplish this task with reasonable results.

However, at the same time, certain critical pages should not be swapped out to disk. This set of critical pages includes, particularly, the pages of memory necessary to execute a page swap. While these pages can, in some virtual memory processes, be readily identified, such identification may not be done so readily in the Apple Macintosh environment where the code which implements virtual memory is added to an existing operating system. Of course, with sufficient knowledge of both the operating system and the process of the present invention, it would be possible to identify, in advance, such critical pages and mark them as immune to page swaps.

The routine shown in FIG. 10 has been optimized for aftermarket use in the Apple Macintosh environment, in part because it does not need advance identification of the critical pages. More specifically, the page selection routine of FIG. 10 relies primarily on three factors: a history table (which is based on usage in the preferred embodiment but may be based on any of a wide variety of criteria), a "don't swap this page" flag, and a page modified flag.

The history table (see FIG. 2b) concept tracks, for example, how recently and frequently a page has been accessed. The "don't swap" flag, discussed further below, protects certain key pages of physical RAM from ever being swapped to disk, and is designed to protect critical information such as the virtual memory code, and some sections of the device manager, disk driver, system traps, and trap patches. The page modified flag determines whether a page has been modified since retrieved from disk.

One reason for determining whether a page has been modified since retrieved from disk relates to the reasons for allocating, in the preferred embodiment, a disk file which is larger than the total amount of memory required to supplement the existing physical memory to the total amount of virtual memory. Thus, for example, for a current Macintosh II which is capable of addressing a maximum of eight megabytes under the current release of the Macintosh operating system, the disk file may also eight megabytes, although either larger or somewhat smaller sizes would also work. This, effectively, permits a disk image of each page to be maintained in physical memory (RAM). It will be apparent to those skilled in the art, given the foregoing discussion and the fact that a disk image can always be maintained for unmodified pages in physical memory, that, where possible, an unmodified page might generally be selected for swapping out, since this eliminates the need for a disk write and correspondingly increases performance. By weighing these factors, as discussed below in connection with FIG. 10, a reasonably optimized candidate for replacement is identified.

In general, the page selection routine shown in FIG. 10 is a "winnowing out" process by which the system itself determines, on a long term iterative basis, what the critical page set is likely to be, and errs generally on the side of including non-critical pages to avoid swapping out critical pages. The first basic assumption is that all pages critical to performing a page swap are used during each complete page swap, where a complete page swap includes both a read and a write. By basing selection of a page to be swapped out initially on page usage history, and not swapping out any page used during each complete swap, all the critical pages (plus some additional, non-critical pages) will be, at least preliminarily, protected from being swapped out.

At this point a potential problem exists. Depending on the size of physical memory, it is possible that the entirety of physical memory will consist of pages that are used during the period of time between each page swap, even though some of those pages are non-critical. This necessitates a second level criteria for deciding which pages are non-critical. While many such criteria will work, a presently preferred approach involves setting a flag bit for each page written in memory during the initial installation of the virtual memory software. This marks all critical pages, but also marks many non-critical pages. It will be apparent to those skilled in the art that the truly critical pages have both a heavy usage history (i.e., satisfy the first criteria), and also have the flag bit set (the second criteria).

The combination of the two criteria then permits selection of a non-critical page for swapping. By using the page usage history criteria to make a determination of which page to swap out so long as not every page is heavily used, non-critical pages including those pages with the flag bit set can be swapped out to disk. Then, in the somewhat unlikely event that every page in memory has a heavy usage history, those pages which do not have a flag bit set can still be selected as non-critical. In this manner, a non-critical page can always be selected to be swapped out to disk.

The page selection routine described generally above can be appreciated in greater detail from the following. The page selection routine is called at step 300, and begins at step 302 by inquiring whether it is time to update the aging tables. The criterion for updating the aging tables can be varied over a fairly wide range, and might include real time, recent usage history of any one or more pages, frequency of occurrence of page faults, or number of page swaps since last update, as just some examples. Time and usage history have thus far been used in a preferred approach. If the inquiry at step 302 determines that it is not time to update, the modified and unmodified pagse with the lowest usage history are identified at step 304.

However, if an update is in order, the time out flag is reset at step 306. The aqing tables are then updated at step 308 with usage information since the last update, and the usage flag is reset. Next, the modified and unmodified pages with the lowest usage history (as stored in the aging tables) are identified at step 310.

Regardless whether the aging tables were updated, the appropriate branch supplies the usage history of the modified and unmodified pages to step 312, where the usage history of the unmodified page is compared to that of the modified page in accordance with any suitable weighting criteria, and the least used page as determined by that criteria is then selected at either step 314 or step 316, and passed to the next step. As noted above, it is faster to mark an unmodified page as non-resident, and so in most cases it is preferable to use a weighting criteria that tends to select unmodified pages to be made non-resident.

In some cases, however, it will not be desirable to swap out the selected page, whether modified or unmodified. Most such pages are marked with a "don't swap" flag. However, it might occur that a page that is not so marked will still be selected by the page selection routine because all pages are being used regularly. Such undesirable swap-outs can be avoided by keeping track of usage history, such as by the aging table discussed above, and imposing a rule that any page which has always been used during the period between any two disk swaps is not to be swapped out. This is shown at step 318, and if the selected, least used page does not have a full usage history, it is selected to be marked non-resident (swapped out) at step 320.

Alternatively, if the page selected as least used does have a full usage history, that page cannot be selected, and the aging tables are again updated at step 322 so that another page can be selected. Pages having a full usage history but which are not marked with a "don't swap" flag may be marked as slow aging pages. Then, as shown at step 324, the aging tables for the fast aging pages can be updated, new "lowest usage" unmodified and modified pages selected, and the routine returned to step 312 for further processing.

Read Patch

The read patch routine, shown in FIGS. 11a–11b, is essentially a pre-fetch of pages of disk data to physical memory. Such a pre-fetch is particularly helpful in the virtual memory context to avoid a page fault during time critical operations in which occurrence of a page fault during the operation can cause an error. An example of such a time critical operation is a read (or write) from disk in which a page fault during the read can cause the status of the disk interface to be lost. More specifically, during a disk reads or writes, the spinning hard disk may not be able to wait and hold its place while a page fault is made good. Thus, it is helpful to avoid such situations by what is referred to herein as "pre-fetching".

Successful use of pre-fetching relies in part on the good programming practice that I/O operations are executed only through the operating system. That is, any program or peripheral that needs to perform an I/O operation posts that request to the operating system. The request to the operating system includes where the information is to be placed in memory, how much information is to be transferred, and where the information can be found. The operating system then performs the operation and returns the result. By intercepting and managing such calls, it is possible to ensure that no page faults will be generated from the I/O request during the critical I/O period.

The solution to this problem used in a preferred embodiment of the present invention amounts to keeping a list of the pending I/O operations, and the locations to which those I/O operations have been directed. Those locations are temporarily marked with a "Don't Swap" flag, and so can be regarded as temporarily locked in physical memory, or RAM. When the I/O operation has been completed, the "Don't Swap" flag is removed for those temporarily locked locations, and they are again free to be swapped if appropriate.

In rare instances, it is possible that an I/O operation will request a single transfer which is larger than the number of available pages of physical memory. For example, a Macintosh computer having only one megabyte of RAM available for such an I/O call may receive a request for a five megabyte transfer. There is not enough memory available to handle the operation in one step. In such event, the process of the present invention can break the large read request into a number of smaller read operations, each of which can be accommodated by the amount of available memory. Thus, for the example of a request for a five megabyte read, the present invention can readjust the I/O call into five one megabyte reads. Following the last small read, the call is readjusted back to appear as if a single five megabyte read occurred, so that the calling program is unaware that the read was not performed as one contiguous piece.

To understand the foregoing in greater detail, reference is again made to FIGS. 11a and 11b. The read patch is entered at step 340, and inquires at step 342 whether the call which entered the read patch is a file system call rather than an I/O call. If it is a file system call, the routine branches to step 344, where it jumps to the original read trap address.

However, if the call which caused entry to the read patch is an I/O call, the routine branches from step 342 to step 346, where supervisor mode is enabled. The system starts with the first block of information to be read from disk, at step 348, and determines at step 350 to what memory page the block will be written. It is then determined, at step 352, whether that page is resident. If not, a determination is made at step 354 whether the page of physical memory will be completely overwritten by the read from disk. If the page is to be overwritten, the disk image flag for the page is cleared at step 356; if not, step 356 is bypassed. Either way, the page fault routine of FIG. 8, beginning at step 222 is then used to validate the page.

If the page was not previously marked with a Don't Swap" flag, the page is then temporarily locked at step 360 by setting its "Don't Swap" flag, and the page is added to a list of temporarily locked pages. Once the page has been temporarily locked, a determination is made at step 362 as to whether additional blocks of data are to be read in. If they are not, the routine branches to step 364 where the requested read is performed, following by unlocking the temporarily locked pages at step 366, restoring the status register from the stack at step 368, and finally returning at step 370.

In many such cases, however, additional blocks of data will be called for, in which case the routine will branch from step 362 to step 372. At step 372, a determination is made whether the maximum number of temporarily lockable pages have already been locked. In most cases, the answer will be no, and the routine will loop by examining the next block to be read from disk at step 374 and then re-entering the routine at step 35o.

In some oases, however, the maximum number of pages will have been locked, as determined at step 372. In such event, it is necessary to break the read into a plurality of smaller reads. To accomplish this, the routine will branch to step 376, where the size of the original read request will be stored. Then, at step 378, the read request is reduced to match the maximum number of allowable locked pages, followed at step by a read of that reduced size.

After completion of the reduced read, another read is set up at step 382, extending from the end of the last block actually read to the end of the originally requested read. Following set up, the next block of information is read from disk at step 384 and, as before, the page to which that block is to be written is identified. If the page is resident, as determined at step 388, the page is added to a second list of temporarily locked pages.

Figure 8:
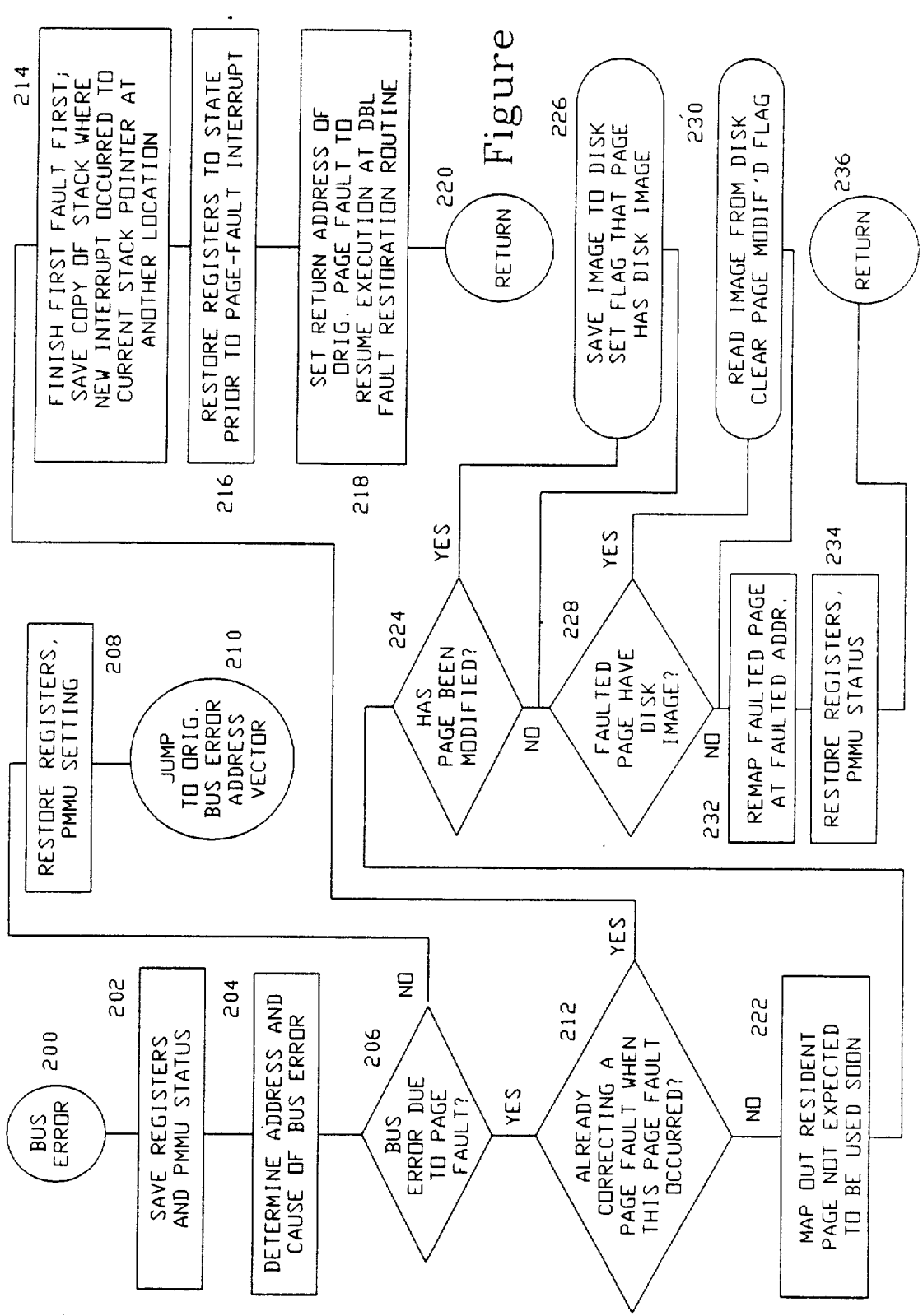
FIG. 8 is a flow diagram of the process of the present invention for handling page swaps between the physical RAM and the virtual address space.

As before, if the page is not resident, an inquiry is made at step 392 whether the page of physical memory will be completely overwritten by the read from disk. If the page is to be completely overwritten, the disk image flag for the page is cleared at step 394. If the page is not to be overwritten, or after clearing the disk image flag if to be overwritten, the routine continues with step 396, where the page fault routine shown beginning at step 222 of FIG. 8 is used to validate the page.

Thereafter, the successive next-last in the list of temporarily locked pages is selected at step 398, and that page is swapped out at step 400. This frees up a page for this block of the read operation (previously no additional pages of physical memory were available since we had reached the maximum number of locked pages in performing the previous section of this I/O call), and so this logical page is then remapped into RAM at step 402 to be ready for the next read, at which time it will overwritten.

The results of either step 390 or step 402 then cause the routine to continue at step 404, where an inquiry is made as to whether there are more blocks to be read in this request. In some cases there will be more blocks to read, in which case the routine will branch to step 406, where a second inquiry is made as to whether the maximum number of temporarily lockable pages has already been locked. In a good percentage of cases the answer will be no, in which case the routine will loop back to step 386 through step 408, where the next block to be read from disk is examined. In some cases, however, the maximum number of temporarily locked pages again will have been met, so that a reduced size read is again required at step 410. In this case, the size of the read is reduced to the amount of validated memory, and then a read is performed at step 412, after which the routine loops back to step 382.

Eventually, the looping will return to step 404, and no more blocks will be requested. At this point, the routine branches to perform the final read, at step 414, followed by unlocking the pages of the second list of temporarily locked pages at step 416. Next, the parameter block pointed to by the original read request is restored to the same state as if it had been completed in one pass, at step 418, and the status register is restored from the stack in step 420. The routine then returns control to the system at step 422. It can be appreciated that, in this manner, large size reads can be accomplished. Although not shown, in a similar fashion a write patch routine may be implemented which breaks write operations from the virtual memory space to a conventional disk file into small enough operations to be processed with the amount of available physical memory. The WRITE PATCH is essentially identical to the READ PATCH, except that steps 354, 356, 392 and 394 may be deleted. A similar technique can be used for any critical operation which cannot tolerate the occurrence of a page fault during the operation.

Attached hereto as Appendix A is a printout, in object code form, of the code necessary to implement the present invention on an Apple Macintosh II operating under the current version (6.0.2) of the Macintosh operating system.

From the foregoing teachings, it can be appreciated by those skilled in the art that a new, novel and unobvious virtual memory system for use on Apple Macintosh personal computers using the 680X0 microprocessors with appropriate memory management has been disclosed. It is to be understood that numerous alternatives and equivalents will be apparent to those of ordinary skill in the art, given the teachings herein, such that the present invention is not to be limited by the foregoing description but only by the appended claims.

```
This is sector 0000 (0) of file " Virtual"
It is absolute sector 24 located at track 2, sector 0

Tags:      0000 0002 0300 0000 9FCC 6432
0000/000:  0000 0100 0000 26A5 0000 25A5 0000 00DB    :......£...%......:
0010/016:  096D 9C37 0000 0400 0000 1000 000D 0000    :.m.7.............:
0020/032:  1081 0B01 0447 6172 624D 4143 2049 4949    :.....GarbMAC III:
0030/048:  0820 5669 7274 7561 6C69 0200 0000 494E    :. Virtuali....IN:
0040/064:  4954 564D 454D 2000 0000 0040 0000 0000    :ITVMEM ....@....:
0050/080:  0000 494E 4954 564D 454D 2000 0000 0040    :...INITVMEM ....@:
0060/096:  0000 0000 0000 0000 0000 0000 0000 0000    :.................:
0070/112:  0000 9F94 A9E6 0000 0000 0000 2780 0000    :..............'..:
0080/128:  0000 0004 E400 0000 0139 0000 0000 0000    :.........9.......:
0090/144:  0000 0004 E400 0139 0139 0000 0000 0000    :........9.9......:
00A0/160:  0000 0000 0000 0000 0000 0000 0000 0000    :.................:
00B0/176:  0000 0000 0000 0000 0000 0000 0000 0000    :.................:
00C0/192:  0000 0000 0000 0000 0000 0000 0000 0000    :.................:
00D0/208:  0000 0000 0000 0000 0000 0000 0000 0000    :.................:
00E0/224:  0000 0000 0000 0000 0000 0000 0000 0000    :.................:
00F0/240:  0000 0000 0000 0000 0000 0000 0000 0000    :.................:
0100/256:  0000 0007 494E 4954 0000 0000 0000 1C56    :.....INIT......V:
0110/272:  4D45 4D00 0000 0146 5245 4600 0000 00F0    :MEM....FREF.....:
0120/288:  2049 434E 2300 0000 00FF 8000 0001 0000    : ICN#............:
0130/304:  0000 0000 0000 0000 0000 0000 0FF0 0000    :.................:
0140/320:  3FFC 0000 F00F 0001 C003 8007 FFFF F005    :?................:
0150/336:  000E D007 001C 7006 E3B8 300E 61F8 380C    :......p...0.a.8.:
0160/352:  31F8 380C 31FC 380C 19DC 380C 1BE6 380C    :1.8.1.8...8...8.:
0170/368:  0FE6 3806 0F03 3806 0E03 B007 1C00 7005    :..8...8.......p.:
0180/384:  B801 D007 FFFF F001 E007 8000 781E 0000    :...............x:
0190/400:  1FF8 0000 07E0 0000 0000 0000 0000 0000    :.................:
01A0/416:  0000 0000 0000 0000 0000 0000 0000 0000    :.................:
01B0/432:  0000 0000 0000 0000 0000 0000 0FF0 0000    :.................:
01C0/448:  3E3C 0000 F80F 0001 C003 8007 FFFF F005    :><...............:
01D0/464:  FFFF D007 FFFF F007 FFFF F00F FFFF F80F    :.................:
01E0/480:  FFFF F80F FFFF F80F FFFF F80F FFFF F80F    :.................:
01F0/496:  FFFF F807 FFFF F807 FFFF F007 FFFF F005    :.................:

This is sector 0001 (1) of file " Virtual"
It is absolute sector 25 located at track 2, sector 1

Tags:      0000 0002 0300 0001 9FCC 5A1D
0000/000:  FFFF D007 FFFF F001 E003 8000 601E 0000    :.............`...:
0010/016:  1FF8 0000 07E0 0000 0000 0000 0000 0000    :.................:
0020/032:  0000 0000 0000 0000 0000 0000 0000 0000    :.................:
0030/048:  0001 0000 0000 0000 0000 0000 0000 0000    :.................:
0040/064:  0000 0000 00C0 0000 01E0 0000 00C0 0000    :.................:
0050/080:  00C0 0000 00C0 0007 FFFF F004 0000 1004    :.................:
0060/096:  0000 1004 E398 1004 6198 1024 31DC 127C    :........a..$1..|:
```

```
0070/112:  31DC 1F7C 1A66 1F24 1A66 1204 0C03 1004    :1..|.f.$.f.....:
0080/128:  0C03 9004 0000 1004 0000 1007 FFFF F000    :................:
0090/144:  00C0 0000 00C0 0000 00C0 0000 01E0 0000    :................:
00A0/160:  00C0 0000 0000 0000 0000 0000 0000 0000    :................:
00B0/176:  0000 0080 0000 0140 0000 0220 0000 0410    :.......@... ....:
00C0/192:  0080 0808 0180 1005 03E0 A003 01C0 C007    :................:
00D0/208:  01C0 E000 01C0 0007 FFFF F007 FFFF F007    :................:
00E0/224:  FFFF F007 FFFF F027 FFFF F27B FFFF EFFF    :.......'...{....:
00F0/240:  FFFF FFFF FFFF FF7B FFFF EF27 FFFF F207    :.......{...'....:
0100/256:  FFFF F007 FFFF F007 FFFF F007 FFFF F000    :................:
0110/272:  01C0 0007 01C0 E003 01C0 C005 03E0 A008    :................:
0120/288:  0180 1010 0080 0820 0000 0440 0000 0280    :....... ...@....:
0130/304:  0000 0100 0001 0000 0000 0000 0000 0000    :................:
0140/320:  0000 0000 0000 0000 00C0 0000 01E0 0000    :................:
0150/336:  00C0 0000 00C0 0000 00C0 0007 FFFF F004    :................:
0160/352:  0000 1004 0000 1004 E398 1004 6198 1024    :............a..$:
0170/368:  31DC 127C 31DC 1F7C 1A66 1F24 1A66 1204    :1..|1..|.f.$.f..:
0180/384:  0C03 1004 0C03 9004 0000 1004 0000 1007    :................:
0190/400:  FFFF F000 00C0 0000 00C0 0000 00C0 0000    :................:
01A0/416:  01E0 0000 00C0 0000 0000 0000 0000 0000    :................:
01B0/432:  0000 0000 0000 0000 0000 0000 0000 0000    :................:
01C0/448:  0000 0000 0000 0000 00C0 0000 01E0 0000    :................:
01D0/464:  00C0 0000 00C0 0000 00C0 0007 FFFF F007    :................:
01E0/480:  FFFF F007 FFFF F007 FFFF F007 FFFF F027    :...............':
01F0/496:  FFFF F27F FFFF FF7F FFFF FF27 FFFF F207    :...........'....:
```

This is sector 0002 (2) of file " Virtual"
It is absolute sector 26 located at track 2, sector 2

```
Tags:      0000 0002 8300 0002 9FCC 6431
0000/000:  FFFF F007 FFFF F007 FFFF F007 FFFF F007    :................:
0010/016:  FFFF F000 00C0 0000 00C0 0000 00C0 0000    :................:
0020/032:  01E0 0000 00C0 0000 0000 0000 0000 0000    :................:
0030/048:  0000 0000 0000 0000 0000 0120 6576 696E    :........... evin:
0040/064:  736F 6E00 0000 0C00 6400 8E01 0202 0102    :son.....d.......:
0050/080:  9A55 5500 0001 2000 0200 0000 0000 0B00    :.UU... .........:
0060/096:  0B00 5E01 7108 9955 682D 4F68 2120 2056    :..^.q..Uh-Oh!  V:
0070/112:  6972 7475 616C 2068 6173 2064 6574 6563    :irtual has detec:
0080/128:  7465 6420 6120 7669 7274 7561 6C20 6D65    :ted a virtual me:
0090/144:  6D6F 7279 2065 7272 6F72 2E20 2050 6C65    :mory error.  Ple:
00A0/160:  6173 6520 6D61 6B65 2061 206E 6F74 6520    :ase make a note :
00B0/176:  6F66 2074 6865 2065 7272 6F72 206E 756D    :of the error num:
00C0/192:  6265 722C 2061 6E64 2063 616C 6C20 436F    :ber, and call Co:
00D0/208:  6E6E 6563 7469 7820 5465 6368 2053 7570    :nnectix Tech Sup:
00E0/224:  706F 7274 3A0D 0D56 6972 7461 6C20 4D65    :port:..Virtal Me:
00F0/240:  6D6F 7279 2045 7272 6F72 2023 225E 3022    :mory Error #"^0":
0100/256:  7400 0000 0000 7201 1B00 8601 5704 0544    :t.....r.....W..D:
0110/272:  616D 6E21 A100 0000 0000 6500 0A00 9601    :amn!......e.....:
0120/288:  0308 5343 6F6E 7469 6E75 696E 6720 7769    :..SContinuing wi:
0130/304:  6C6C 2070 726F 6261 626C 7920 2874 686F    :ll probably (tho:
0140/320:  7567 6820 6E6F 7420 7769 7468 2061 6273    :ugh not with abs:
0150/336:  6F6C 7574 6520 6365 7274 6169 6E74 7929    :olute certainty):
0160/352:  2063 6175 7365 2061 2073 7973 7465 6D20    : cause a system :
0170/368:  6372 6173 683A 0000 0020 8860 4824 436F    :crash:... .`H$Co:
0180/384:  7079 7269 6768 7420 3139 3838 2043 6F6E    :pyright 1988 Con:
0190/400:  6E65 6374 6978 2043 6F72 706F 7261 7469    :nectix Corporati:
01A0/416:  6F6E 0000 001D 5772 6974 7465 6E20 6279    :on....Written by:
01B0/432:  204A 6F6E 6174 6861 6E20 462E 2047 6172    : Jonathan F. Gar:
01C0/448:  6265 7200 000C 3800 030C B166 001E EA0C    :ber...8....f....:
```

```
01D0/464:  3800 0201 2F65 001E E030 3802 8E02 40C0    :8.../e...08...@.:
01E0/480:  0066 001E D441 FA00 9420 3900 7F40 00B0    :.f...A... 9..@..:
01F0/496:  9067 001D B060 0017 8400 0000 0000 0000    :.g...`..........:
```

This is sector 0003 (3) of file " Virtual"
It is absolute sector 27 located at track 2, sector 3

```
Tags:      0000 0002 0300 0003 9FCC 5A1D
0000/000:  0000 0000 0000 0000 0000 0000 0000 0000    :................:
0010/016:  0000 0000 0000 0000 0000 0000 0000 0000    :................:
0020/032:  0000 0000 0000 0000 0000 0000 0000 0000    :................:
0030/048:  0000 0000 0000 0000 0000 0000 0000 0000    :................:
0040/064:  0000 0000 0000 0000 0000 0000 0000 0000    :................:
0050/080:  0000 0000 0000 0000 0000 0000 0000 0000    :................:
0060/096:  0000 0000 0000 0000 0000 0000 0000 0000    :................:
0070/112:  0000 0000 0000 0000 0000 0000 0800 0A00    :................:
0080/128:  0808 0A00 0810 0A00 0818 0A00 0820 0A00    :................:
0090/144:  0828 0A00 0830 0A00 0838 0A40 0000 19F9    :.(...0...8.@....:
00A0/160:  0000 59FA 0000 59FB 0000 59FC 0000 59FD    :..Y...Y...Y...Y.:
00B0/176:  0000 59FE 0000 5950 0000 5900 0840 8A10    :..Y...YP..Y..@..:
00C0/192:  0000 5920 0000 5930 0000 5940 0000 5950    :..Y ..Y0..Y@..YP:
00D0/208:  0000 5960 0000 5970 0000 5980 0000 5990    :..Y`..Yp..Y...Y.:
00E0/224:  0000 59A0 0000 59B0 0000 59C0 0000 59D0    :..Y...Y...Y...Y.:
00F0/240:  0000 59E0 0000 59F0 0000 5900 0840 CA01    :..Y...Y...Y..@..:
0100/256:  0000 5902 0000 5903 0000 5904 0000 5905    :..Y...Y...Y...Y.:
0110/272:  0000 5906 0000 5907 0000 5908 0000 5909    :..Y...Y...Y...Y.:
0120/288:  0000 590A 0000 590B 0000 590C 0000 590D    :..Y...Y...Y...Y.:
0130/304:  0000 590E 0000 590F 0000 5900 0800 0A00    :..Y...Y...Y.....:
0140/320:  0808 0A00 0810 0A00 0818 0A00 0820 0A00    :................:
0150/336:  0828 0A00 0830 0A00 0838 0A00 8000 1900    :.(...0...8......:
0160/352:  9000 1900 A000 1900 B000 1900 C000 1900    :................:
0170/368:  D000 1900 E000 1900 F000 1900 0000 0000    :................:
0180/384:  0000 0000 0000 0000 0000 0000 0000 0000    :................:
0190/400:  0000 0000 0000 0000 0000 0000 0000 0000    :................:
01A0/416:  0000 0000 0000 0000 0000 0000 0000 0000    :................:
01B0/432:  0000 0000 0000 0000 0000 0000 0000 0000    :................:
01C0/448:  0000 0000 0000 0000 0000 0000 0000 0000    :................:
01D0/464:  0000 0000 0000 0000 0000 0000 0000 0000    :................:
01E0/480:  0000 0000 0000 0000 0000 0000 0000 0000    :................:
01F0/496:  0000 0000 0000 0000 0000 0000 0000 0000    :................:
```

This is sector 0004 (4) of file " Virtual"
It is absolute sector 28 located at track 2, sector 4

```
Tags:      0000 0002 0300 0004 9FCC 5A1D
0000/000:  0000 0000 0000 0000 0000 0000 0000 0000    :................:
0010/016:  0000 0000 0000 0000 0000 0000 0000 0000    :................:
0020/032:  0000 0000 0000 0000 0000 0000 0000 0000    :................:
0030/048:  0000 0000 0000 0000 0000 0000 0000 0000    :................:
0040/064:  0000 0000 0000 0000 0000 0000 0000 0000    :................:
0050/080:  0000 0000 0000 0000 0000 0000 0000 0000    :................:
0060/096:  0000 0000 0000 0000 0000 0000 0000 0000    :................:
0070/112:  0000 0000 0000 0000 0000 0040 E712 380C    :...........@..8.:
0080/128:  B23F 0102 8000 0000 FF67 0E22 3C80 B044    :.?.......g."<..D:
0090/144:  492F 3C00 0840 4060 0C22 3C80 B849 002F    :I/<..@@`."<..I./:
00A0/160:  3C00 0840 002F 3C7F FF02 0200 7C07 0011    :<..@./<.....|...:
00B0/176:  C00C B2F0 1F4C 00F0 0040 00F0 0140 00F0    :.....L...@...@..:
00C0/192:  0024 004E 7A00 0208 C000 034E 7B00 0230    :.$.Nz......N{..0:
00D0/208:  1F02 4000 FF46 DF4E 7502 8000 0000 FFB0    :..@..F.Nu.......:
```

```
00E0/224:  380C B266 964E 754E F081 E100 7C40 E708    :8..f.NuN....|@..:
00F0/240:  1700 0D66 122F 0A4E 6A4A 6A08 004A 6AF8    :...f./.NjJj..Jj.:
0100/256:  004A 52C5 4F24 524E 7524 436F 7079 7269    :.JR.O$RNu$Copyri:
0110/272:  6768 7420 3139 3838 2043 6F6E 6E65 6374    :ght 1988 Connect:
0120/288:  6978 2043 6F72 706F 7261 7469 6F6E 0000    :ix Corporation..:
0130/304:  001D 5772 6974 7465 6E20 6279 204A 6F6E    :..Written by Jon:
0140/320:  6174 6861 6E20 462E 2047 6172 6265 7200    :athan F. Garber.:
0150/336:  0000 0000 0000 0000 0000 0000 0000 0000    :................:
0160/352:  0000 0000 0000 0000 0000 0000 0000 0000    :................:
0170/368:  0000 0000 0000 0000 0000 0000 0000 0000    :................:
0180/384:  0000 0000 7F04 0000 0000 0000 0000 0000    :................:
0190/400:  0000 0000 08FF DF01 8352 0000 0104 00FF    :.........R......:
01A0/416:  FF00 0000 0000 0000 0000 0000 0000 0000    :................:
01B0/432:  0000 6900 7F3F 7C0F BF00 0000 0000 0000    :..i..?|.........:
01C0/448:  0000 0000 0000 0000 0000 0000 7F81 0000    :................:
01D0/464:  0000 0000 0000 0000 0000 0000 0000 0000    :................:
01E0/480:  0000 0000 0000 0000 0000 0000 0000 0000    :................:
01F0/496:  0000 0000 0000 0000 0000 0000 0000 0000    :................:
```

This is sector 0005 (5) of file " Virtual"
It is absolute sector 29 located at track 2, sector 5

```
Tags:      0000 0002 0300 0005 9FCC 5A1D
0000/000:  0000 0000 0000 0000 0000 0000 0000 0000    :................:
0010/016:  0000 0000 0000 0000 0000 0000 0000 0000    :................:
0020/032:  0000 0000 0000 0000 0000 0048 E7FF FAF0    :...........H....:
0030/048:  2762 0055 8F32 2F00 4608 0100 0867 0620    :'b.U.2/.F....g. :
0040/064:  6F00 4C60 220C 6FB0 0000 4264 0820 6F00    :o.L`".o...Bd. o.:
0050/080:  3E58 8860 0420 6F00 6008 0100 0E66 0808    :>X.`. o.`....f..:
0060/096:  0100 0F67 4655 88F0 109F 57F0 0062 0048    :...gFU....W..b.H:
0070/112:  40ED C000 0667 1E0C 4000 0566 2E20 08C0    :@....g..@..f. ..:
0080/128:  B803 1A0C 8000 8000 0064 20D5 FC00 7700    :.........d ...w.:
0090/144:  0061 2860 0A08 0100 0767 10F0 1020 0954    :.a(`.....g... .T:
00A0/160:  8FF0 1F60 004C DF5F FF4E 7354 8FF0 1F60    :...`.L._.NsT...`:
00B0/176:  004C DF5F FF4E F081 E100 0824 124D FAFE    :.L._.N.....$.M..:
00C0/192:  BC43 FAFE BC52 AE00 2840 E700 7C06 0008    :.C...R..(@..|...:
00D0/208:  EE00 0700 1466 0A2D 4F00 4046 DF60 0000    :.....f.-O.@F.`..:
00E0/224:  C4B5 D666 0842 96B5 D167 0660 06B5 D166    :...f.B...g.`...f:
00F0/240:  1842 9100 6A01 0100 02F0 0024 002D 4A00    :.B..j......$.-J.:
0100/256:  4C52 6E00 4A46 DF4E 7530 1FB0 6E00 5463    :LRn.JF.NuO..n.Tc:
0110/272:  043D 4000 5452 6E00 4808 EA00 0800 022D    :.=@.TRn.H......-:
0120/288:  4A00 4C52 6E00 4A50 EE00 5620 2E00 4490    :J.LRn.JP..V ..D.:
0130/304:  8FE2 8853 8022 0022 6E00 5032 DF51 C8FF    :...S."."n.P2.Q..:
0140/320:  FC2D 5F00 4420 5F54 8822 C822 D022 CF22    :.-_.D _T."."."."
0150/336:  C12D 4900 5049 FA00 1420 8C54 8FF0 1F60    :.-I.PI... .T...`:
0160/352:  004C DF5F FF00 5706 004E 734D FAFE 0E22    :.L._..W..NsM...":
0170/368:  6E00 5020 2158 802E 6141 FA00 1E23 48FF    :n.P !X..aA...#H.:
0180/384:  F23F 2151 C8FF FC2D 4900 504E 7523 DF00    :.?!Q...-I.PNu#..:
0190/400:  7F43 44DE FC00 404E 732F AF00 0481 512E    :.CD...@Ns/....Q.:
01A0/416:  574E 754A 9666 104A 9167 062C 9142 9160    :WNuJ.f.J.g.,.B.`:
01B0/432:  F228 4E61 0000 D44A 9166 0628 4961 0000    :.(Na...J.f.(Ia..:
01C0/448:  CA20 1667 DE22 1167 DA26 4026 1302 43F8    :. .g.".g.&@&..C.:
01D0/464:  0002 8200 0007 0084 8300 4200 0976 000E    :..........B..v..:
01E0/480:  FCE0 4090 C166 BC61 1E20 1208 0000 0066    :..@..f.a. .....f:
01F0/496:  100E D200 8066 0AF0 0024 0042 2E00 144E    :.....f...$.B...N:
```

This is sector 0006 (6) of file " Virtual"
It is absolute sector 30 located at track 2, sector 6

```
Tags:      0000 0002 0300 0006 9FCC 5A1D
0000/000:  7542 2E00 144E 7508 0200 0967 7600 4200    :uB...Nu....gv.B.:
```

```
0010/016:  1923 C200 7F3F 7CF0 0024 0041 FAFB 5E20    :.#...?|..$.A..^ :
0020/032:  0A61 000A 92D0 AE00 1C21 4000 2E2F 3900    :.a.......!@../9.:
0030/048:  7F43 104A F900 7F43 1067 0652 6E00 5AA0    :.C.J...C.g.Rn.Z.:
0040/064:  0648 E760 E032 3CA2 024E BB81 61FD B04C    :.H.`.2<..N..a..L:
0050/080:  DF07 064A 4067 1CB0 6E00 5C66 0260 1423    :...J@g..n.\f.`.#:
0060/096:  DF00 7F43 1008 2A00 0000 0366 163D 4000    :...C..*....f.=@.:
0070/112:  5C60 9E23 DF00 7F43 1008 EE00 0000 3E42    :\`.#...C......>B:
0080/128:  6E00 5C08 8200 044E 757A 0B2F 0A43 FA10    :n.\....Nuz./.C..:
0090/144:  EC45 FA0C E02E 120C 6E00 0800 2C65 0001    :.E......n...,e..:
00A0/160:  4A26 3801 6AB6 AE00 3065 0001 3ED6 BAFD    :J&8.j...0e..>...:
00B0/176:  007E 0042 6E00 2C2D 4300 3061 100C 2E00    :.~.Bn.,-C.0a....:
00C0/192:  0300 3E66 5842 2E00 3E60 0000 BC20 6E00    :..>fXB..>`... n.:
00D0/208:  0830 3AFC E422 0804 8100 7F00 806A 0A78    :.0:.."......j.x:
00E0/224:  FF38 0020 7AFC CE60 0EE4 8938 0148 4490    :.8. z..`...8.HD.:
00F0/240:  4138 0053 8448 4420 2008 0000 0067 0608    :A8.S.HD  ....g..:
0100/256:  0000 0867 1251 CCFF F020 7AFC A848 440C    :...g.Q... z..HD.:
0110/272:  44FF FF66 E2A9 FF58 8876 FF4E 7520 2008    :D..f...X.v.Nu  .:
0120/288:  0000 0067 4E08 0000 0866 4808 0000 0A66    :...gN....fH....f:
0130/304:  422C 0008 8000 0367 1020 80EA AE32 3162    :B,.....g. ...21b:
0140/320:  00E2 4908 C100 0F60 08EA AE32 3162 00E2    :..I....`...21b..:
0150/336:  4933 8162 00B6 4165 1A67 0C7E 0026 4836    :I3.b..Ae.g.~.&H6:
0160/352:  0167 0001 0460 0C0C 4701 0064 0652 4725    :.g...`..G..d.RG%:
0170/368:  8874 0051 CCFF A820 7AFC 3A48 440C 44FF    :.t.Q... z.:HD.D.:
0180/384:  FF66 9A60 0000 E220 2008 0000 0067 4808    :.f.`...  ....gH.:
0190/400:  0000 0866 422C 0008 8000 0367 1020 80EA    :...fB,.....g. ..:
01A0/416:  AE32 3162 00E2 4908 C100 0F60 08EA AE32    :.21b..I....`...2:
01B0/432:  3162 00E2 4933 8162 00B6 4165 1A67 0C7E    :1b..I3.b..Ae.g.~:
01C0/448:  0026 4836 0167 0000 A060 0C0C 4701 0064    :.&H6.g...`..G..d:
01D0/464:  0652 4725 8874 0051 CCFF AE20 7AFB D648    :.RG%.t.Q... z..H:
01E0/480:  440C 44FF FF66 A060 7E4A 4767 3422 0753    :D.D..f.`~JGg4".S:
01F0/496:  4748 4192 4726 7214 0026 1308 0300 0067    :GHA.G&r..&.....g:
```

This is sector 0007 (7) of file " Virtual"
It is absolute sector 31 located at track 2, sector 7

```
Tags:      0000 0002 0300 0007 9FCC 5A1D
0000/000:  E808 0300 0866 E224 872C 0324 5FEA AE33    :.....f.$.,.$_..3:
0010/016:  BC80 0062 002D 4B00 0852 6E00 2C60 0000    :...b.-K..Rn.,`..:
0020/032:  8261 00FE AA20 2008 0000 0067 2A08 0000    :.a...  ....g*...:
0030/048:  0866 242C 00EA AE32 3162 00B6 4165 1867    :.f$,...21b..Ae.g:
0040/064:  0A7E 0026 4836 0167 1E60 0C0C 4701 0064    :.~.&H6.g.`..G..d:
0050/080:  0652 4725 8874 0051 CCFF CC20 7AFB 5648    :.RG%.t.Q... z.VH:
0060/096:  440C 44FF FF66 BE38 0748 473E 0424 872D    :D.D..f.8.HG>.$.-:
0070/112:  4B00 0824 5F3C 036A 182D 7C00 0000 0200    :K..$_<.j.-|.....:
0080/128:  300C 46FF FF66 0A26 1308 0300 0A66 00FD    :0.F..f.&.....f..:
0090/144:  FA26 132C 03EA AE33 BC80 0062 0052 6E00    :.&.,...3...b.Rn.:
00A0/160:  2C41 FAF8 D828 8B23 C300 7F3F 7C02 43FE    :,A...(.#...?|.C.:
00B0/176:  FC26 83F0 0024 0008 0300 0467 7020 0B61    :.&...$.....gp .a:
00C0/192:  0007 F4D0 AE00 1C21 4000 2E2F 3900 7F43    :.......!@../9..C:
00D0/208:  104A F900 7F43 1067 0652 6E00 5AA0 0648    :.J...C.g.Rn.Z..H:
00E0/224:  E760 E032 3CA2 034E BB81 61FB 164C DF07    :.`.2<..N..a..L..:
00F0/240:  064A 4067 20B0 6E00 5C66 0260 1823 DF00    :.J@g .n.\f.`.#..:
0100/256:  7F43 1008 2B00 0000 0366 223D 4000 5C08    :.C..+....f"=@.\.:
0110/272:  C300 0060 8C23 DF00 7F43 1042 6E00 5C08    :...`.#...C.Bn.\.:
0120/288:  EE00 0100 3E08 C300 0908 8300 0428 1467    :....>........(.g:
0130/304:  00FD 5820 1308 0000 0066 00FD 4E0E FCB0    :..X .....f..N...:
0140/320:  C0C1 0466 E843 FAFA 384E 7541 FAF8 2E4D    :...f.C..8NuA...M:
0150/336:  FAFA 2A42 A800 0C42 A800 1242 6800 1642    :..*B...B...Bh..B:
0160/352:  6800 1CA2 0767 024E 713D 6800 4400 1A26    :h....g.Nq=h.D..&:
```

```
0170/368: 2800 3078 0038 2800 38C8 FC02 0031 780A    :(.0x.8(.8....1x.:
0180/384: 5A00 1842 A800 1C43 FA09 C821 4900 1270    :Z..B...C...!I..p:
0190/400: 08A2 6067 024E 7142 A800 0C42 2800 1A11    :..`g.NqB...B(...:
01A0/416: 7C00 0300 1B42 A800 1CA0 0067 024E 713D    :|....B.....g.Nq=:
01B0/432: 6800 1800 2E22 7803 4ED2 E800 187A 007C    :h...."x.N....z.|:
01C0/448: 003A 2900 263C 2900 284C 0350 05DA 842D    :.:).&<).(L.P...-:
01D0/464: 4500 1C4C 0360 06BC A900 0C67 024E 7122    :E..L.`.....g.Nq":
01E0/480: 6900 1430 2900 483D 4000 1831 4000 1631    :i..0).H=@..1@..1:
01F0/496: 6E00 1A00 1821 7C00 7EF8 0000 2021 7C00    :n....!|.~... !|.:
```

This is sector 0008 (8) of file " Virtual"
It is absolute sector 32 located at track 2, sector 8

```
Tags:     0000 0002 0300 0008 9FCC 5A1D
0000/000: 0008 0000 2431 7C00 0100 2C42 A800 0C4E    :....$1|...,B...N:
0010/016: 7500 0000 0000 0000 0000 0000 0000 0000    :u...............:
0020/032: 0000 0000 0000 0000 0000 0000 0000 0000    :................:
0030/048: 0000 0000 0000 0000 0000 0000 0000 0000    :................:
0040/064: 0000 0000 0000 0000 0000 0000 0000 0000    :................:
0050/080: 0000 0000 0000 0000 0000 0000 0000 0000    :................:
0060/096: 0000 0000 0000 0000 0000 0000 0000 0000    :................:
0070/112: 0000 0000 0000 0000 0000 0000 0000 0000    :................:
0080/128: 0000 0000 0000 0000 0000 0000 0000 0000    :................:
0090/144: 0000 0000 0000 0000 0000 0000 0000 0000    :................:
00A0/160: 0000 0000 0000 0000 0000 0000 0000 0000    :................:
00B0/176: 0000 0000 0000 0000 0000 0000 0000 0000    :................:
00C0/192: 0000 0000 0000 0000 0000 0000 0000 0000    :................:
00D0/208: 0000 0000 0000 0000 0000 0000 0000 0000    :................:
00E0/224: 0000 0000 0000 0000 0000 0000 0000 0000    :................:
00F0/240: 0000 0000 0000 0000 0000 0000 0000 0000    :................:
0100/256: 0000 0000 0000 0000 0000 0000 0000 0000    :................:
0110/272: 0000 0000 0000 0000 0000 0000 0000 0000    :................:
0120/288: 0000 0000 0000 0000 0000 0000 0000 0000    :................:
0130/304: 0000 0000 0000 0000 0000 0000 0000 0000    :................:
0140/320: 0000 0000 0000 0000 0000 0000 0000 0000    :................:
0150/336: 0000 0000 0000 0000 0000 0000 0000 0000    :................:
0160/352: 0000 0000 0000 0000 0000 0000 0000 0000    :................:
0170/368: 0000 0000 0000 0000 0000 0000 0000 0000    :................:
0180/384: 0000 0000 0000 0000 0000 0000 0000 0000    :................:
0190/400: 0000 0000 0000 0000 0000 0000 0000 0000    :................:
01A0/416: 0000 0000 0000 0000 0000 0000 0000 0000    :................:
01B0/432: 0000 0000 0000 0000 0000 0000 0000 0000    :................:
01C0/448: 0000 0000 0000 0000 0000 0000 0000 0000    :................:
01D0/464: 0000 0000 0000 0000 0000 0000 0000 0000    :................:
01E0/480: 0000 0000 0000 0000 0000 0000 0000 0000    :................:
01F0/496: 0000 0000 0000 0000 0000 0000 0000 0000    :................:
```

This is sector 0009 (9) of file " Virtual"
It is absolute sector 33 located at track 2, sector 9

```
Tags:     0000 0002 0300 0009 9FCC 5A1D
0000/000: 0000 0000 0000 0000 0000 0000 0000 0000    :................:
0010/016: 0000 0000 0000 0000 0000 0000 0000 0000    :................:
0020/032: 0000 0000 0000 0000 0000 0000 0000 0000    :................:
0030/048: 0000 0000 0000 0000 0000 0000 0000 0000    :................:
0040/064: 0000 0000 0000 0000 0000 0000 0000 0000    :................:
0050/080: 0000 0000 0000 0000 0000 0000 0000 0000    :................:
0060/096: 0000 0000 0000 0000 0000 0000 0000 0000    :................:
0070/112: 0000 0000 0000 0000 0000 0000 0000 0000    :................:
```

| | 31 | 32 |
|---|---|---|

```
0080/128: 0000 0000 0000 0000 0000 0000 0000 0000    :................:
0090/144: 0000 0000 0000 0000 0000 0000 0000 0000    :................:
00A0/160: 0000 0000 0000 0000 0000 0000 0000 0000    :................:
00B0/176: 0000 0000 0000 0000 0000 0000 0000 0000    :................:
00C0/192: 0000 0000 0000 0000 0000 0000 0000 0000    :................:
00D0/208: 0000 0000 0000 0000 0000 0000 0000 0000    :................:
00E0/224: 0000 0000 0000 0000 0000 0000 0000 0000    :................:
00F0/240: 0000 0000 0000 0000 0000 0000 0000 0000    :................:
0100/256: 0000 0000 0000 0000 0000 0000 0000 0000    :................:
0110/272: 0000 0000 0000 0000 0000 0000 0000 0000    :................:
0120/288: 0000 0000 0000 0000 0000 0000 0000 0000    :................:
0130/304: 0000 0000 0000 0000 0000 0000 0000 0000    :................:
0140/320: 0000 0000 0000 0000 0000 0000 0000 0000    :................:
0150/336: 0000 0000 0000 0000 0000 0000 0000 0000    :................:
0160/352: 0000 0000 0000 0000 0000 0000 0000 0000    :................:
0170/368: 0000 0000 0000 0000 0000 0000 0000 0000    :................:
0180/384: 0000 0000 0000 0000 0000 0000 0000 0000    :................:
0190/400: 0000 0000 0000 0000 0000 0000 0000 0000    :................:
01A0/416: 0000 0000 0000 0000 0000 0000 0000 0000    :................:
01B0/432: 0000 0000 0000 0000 0000 0000 0000 0000    :................:
01C0/448: 0000 0000 0000 0000 0000 0000 0000 0000    :................:
01D0/464: 0000 0000 0000 0000 0000 0000 0000 0000    :................:
01E0/480: 0000 0000 0000 0000 0000 0000 0000 0000    :................:
01F0/496: 0000 0000 0000 0000 0000 0000 0000 0000    :................:

This is sector 000A (10) of file " Virtual"
It is absolute sector 34 located at track 2, sector 10

Tags:     0000 0002 0300 000A 9FCC 5A1D
0000/000: 0000 0000 0000 0000 0000 0000 0000 0000    :................:
0010/016: 0000 0000 0000 0000 0000 004A 6800 186B    :...........Jh..k:
0020/032: 064E FB81 61F5 D840 E742 672F 3AF5 CE48    :.N..a..@.Bg/:..H:
0030/048: E7FF FA4D FAF5 4642 6E00 7847 FAFB D620    :...M..FBn.xG... :
0040/064: 2800 24B0 AE00 7463 042D 4000 7426 2800    :(.$...tc.-@.t&(.:
0050/080: 20C6 B803 1A28 43D0 8302 43F8 0022 4376    : ....(C...C.."Cv:
0060/096: 0032 3C00 FFF0 149D 57D5 FC00 7700 00B3    :.2<.....W...w...:
0070/112: CC66 16D2 FC08 00B0 8965 124A 6F00 3C66    :.f.......e.Jo.<f:
0080/128: 0C02 6AFC FF00 0260 04D2 FC08 00F0 8B00    :..j....`........:
0090/144: 0E48 E7D0 D861 00F6 244C DF1B 0B08 EA00    :.H...a..$L......:
00A0/160: 0800 0266 0C4A 4366 0226 1352 8327 8A34    :...f.JCf.&.R.'.4:
00B0/176: 0028 49B0 8C53 C9FF AE52 4167 6626 834C    :.(I..S...RAgf&.L:
00C0/192: DF5F FF66 0461 0E60 0461 0A61 2C5C 8F46    :._.f.a.`.a.a,\.F:
00D0/208: DF4A 404E 7550 F900 7F43 104E B781 6100    :.J@NuP...C.N..a.:
00E0/224: 044A 4067 0C0C 40FF E567 F00C 40FF EF67    :.J@g..@..g..@..g:
00F0/240: EA42 3900 7F43 104E 7548 E710 1047 FAFB    :.B9..C.NuH...G..:
0100/256: 1426 1B66 0260 1453 4308 B300 0835 1200    :.&.f.`.SC....5..:
0110/272: 0257 CBFF F64A 436B 0260 EE42 A34C DF08    :.W...JCk.`.B.L..:
0120/288: 084E 7526 834D FAF4 542D 6800 2400 603D    :.Nu&.M..T-h.$.`=:
0130/304: 6800 2C00 642D 6800 2E00 6890 8922 2800    :h.,.d-h...h.."(.:
0140/320: 2492 8026 0102 41FE 0021 4100 2402 8300    :$..&..A..!A.$...:
0150/336: 0001 FFD0 832D 4000 6C93 C32D 4900 704C    :.....-@.l..-I.pL:
0160/352: DF5F FF61 00FF 7048 E7FF FA70 01EF E803    :._.a..pH...p....:
0170/368: 8200 2C4D FAF4 0649 FAFA 9A20 2800 24D1    :..,M...I... (.$.:
0180/384: A800 2E20 3AF4 6221 4000 2426 3AF4 5E21    :... :.b!@.$&:.^!:
0190/400: 4300 20D0 8306 8300 0001 FF02 43F8 0022    :C. .........C..":
01A0/416: 4322 1C57 812F 14F0 119D 57D2 FC08 00D5    :C".W./....W.....:
01B0/432: FC00 7700 00B0 8965 0C4A 6F00 3C66 0602    :..w....e.Jo.<f..:
01C0/448: 6AFC FF00 02F0 8B00 4C26 7414 0426 1348    :j.......L&t..&.H:
01D0/464: E7C0 C041 FAF1 A661 00F8 C824 1202 43F8    :...A...a...$..C.:
01E0/480: 0002 8200 0007 0084 8300 4200 1961 00F6    :..........B..a..:
01F0/496: 1808 C200 0820 1208 0000 0066 00F6 040E    :..... ....f....:
```

This is sector 000B (11) of file " Virtual"
It is absolute sector 35 located at track 2, sector 11

```
Tags:      0000 0002 0300 000B 9FCC 5A1D
0000/000:  D200 8066 00F5 FC29 8A14 04F0 0024 004C    :...f...).....$.L:
0010/016:  DF03 0308 EA00 0800 0266 1E4A 4167 1008    :.........f.JAg..:
0020/032:  B400 0815 2200 0400 0229 8A14 0460 0A08    :...."....)...`..:
0030/048:  B700 0881 5200 022E 8AB0 8953 C9FF 6A28    :....R......S..j(:
0040/064:  9F52 4166 1222 2C00 0429 6C03 FC00 0429    :.RAf.",..)l....):
0050/080:  4103 FC60 00FE E64C DF5F FF61 00FE 7861    :A..`...L._.a..xa:
0060/096:  00FE 9821 7AF3 7600 2421 7AF3 7000 2831    :...!z.v.$!z.p.(1:
0070/112:  7AF3 6E00 2C60 00FE 564A 6800 186B 064E    :z.n.,`..VJh..k.N:
0080/128:  FB81 61F3 7E40 E73F 3CFF FF2F 3AF3 7248    :..a.~@.?<../:.rH:
0090/144:  E7FF FA4D FAF2 E650 EE00 7860 00FD 9EC0    :...M...P..x`....:
00A0/160:  B803 1A02 8007 FFF8 00EF 8848 4006 8000    :..........H@...:
00B0/176:  7F00 004E 7504 8000 7F00 0048 40EE 884E    :...Nu......H@..N:
00C0/192:  7508 1700 0D67 064E F081 E100 282F 0A4E    :u....g.N....(/.N:
00D0/208:  6A25 2F00 0825 2F00 044E 6224 5F2F 7800    :j%/..%/..Nb$_/x.:
00E0/224:  2800 0202 573F FF4E 7324 5F4E BB81 61F3    :(...W?.Ns$_N..a.:
00F0/240:  1A4E F081 E100 200C AF00 7F50 7C00 0264    :.N.... ....P|..d:
0100/256:  140C AF00 7F00 0000 0265 0A3F 5700 0654    :.........e.?W..T:
0110/272:  AF00 024E 772F 0AC5 8A34 3781 6100 060C    :...Nw/...47.a...:
0120/288:  4240 E767 0000 A20C 4200 7C67 0000 B00C    :B@.g....B.|g....:
0130/304:  4246 DF67 0000 BE0C 424E 7366 0CC5 8A45    :BF.g....BNsf...E:
0140/320:  FAF2 B434 FC80 8060 600C 4240 C067 0000    :...4...``.B@.g..:
0150/336:  B60C 424E 7A67 480C 424E 7B67 420C 42F3    :..BNzgH.BN{gB.B.:
0160/352:  5F67 0000 BA0C 42F3 2767 0000 C00C 4240    :_g....B.'g....B@:
0170/368:  C167 0000 9E0C 4246 FC67 0000 BE0C 4202    :.g....BF.g....B.:
0180/384:  7C67 0000 C80C 420A 7C67 0000 D40C 424E    :|g....B.|g....BN:
0190/400:  7267 0000 E002 42FF C00C 4246 C067 9EC5    :rg....B...BF.g..:
01A0/416:  8A45 FAF2 5234 FC80 0024 8F4E 6A25 2F00    :.E..R4...$.Nj%/.:
01B0/432:  0825 2F00 0400 52A0 004A 6A00 324A 6AFE    :.%/...R..Jj.2Jj.:
01C0/448:  00C5 4F24 524E 73C5 8A4E 6A35 2F00 0408    :..O$RNs..Nj5/...:
01D0/464:  D200 0D4E 6254 AF00 0660 0000 AC34 3781    :...NbT...`...47.:
01E0/480:  6200 0600 02B5 6F00 04C5 8A58 AF00 0660    :b.....o....X...`:
01F0/496:  0000 96C5 8A4E 6A3F 5A00 044E 6254 AF00    :.....Nj?Z..NbT..:
```

This is sector 000C (12) of file " Virtual"
It is absolute sector 36 located at track 3, sector 0

```
Tags:      0000 0002 0300 000C 9FCC 5A1D
0000/000:  0660 0000 84C5 8A30 2F00 0454 AF00 0660    :.`.....0/..T...`:
0010/016:  76C5 8A32 2F00 0454 AF00 0660 6AC5 8A4E    :v..2/..T...`j..N:
0020/032:  6AF3 5A4E 6254 AF00 0660 5CC5 8A4E 6AF3    :j.ZNbT...`\..Nj.:
0030/048:  224E 6254 AF00 0660 4EC5 8A3F 7781 6200    :"NbT...`N..?w.b.:
0040/064:  0600 0200 0458 AF00 0660 3C34 3781 6200    :.....X...`<47.b.:
0050/080:  0600 02C5 6F00 04C5 8A58 AF00 0660 2834    :....o....X...`(4:
0060/096:  3781 6200 0600 02B5 6F00 04C5 8A58 AF00    :7.b.....o....X..:
0070/112:  0660 14C5 8A3F 7781 6200 0600 0200 043F    :.`...?w.b......?:
0080/128:  BC60 FE81 6100 0624 5F08 9700 0D4E 732F    :.`..a..$_....Ns/:
0090/144:  0A45 FAF1 6208 9A00 0767 4208 9A00 0766    :.E..b....gB....f:
00A0/160:  1E24 5225 6F00 0800 0424 AF00 0402 525F    :.$R%o....$....R_:
00B0/176:  FFC5 4FD4 FC00 104E 6224 6AFF F04E 7324    :..O..OT..Nb$j..Ns$:
00C0/192:  5225 6F00 0800 0424 AF00 0408 9200 0DC5    :R%o....$........:
00D0/208:  4FD4 FC00 104E 6224 6AFF F04E 7308 2F00    :O....Nb$j..Ns./.:
00E0/224:  0D00 0467 0A24 5F44 D74E F081 E100 244E    :...g.$_D.N....$N:
00F0/240:  6A25 2F00 0C25 2F00 0825 2F00 044E 6224    :j%/..%/..%/..Nb$:
0100/256:  5F2F 7800 2400 0202 573F FF4E 734A 3900    :_/x.$...W?.NsJ9.:
0110/272:  7F43 1467 2848 E7FF FAF0 2762 0055 8F2F    :.C.g(H....'b.U./:
```

```
0120/288: 3900 7F43 402F 3900 7F43 4423 CF00 7F43    :9..C@/9..CD#...C:
0130/304: 443F 2F00 4A48 7AF2 563F 2F00 4A3F 2F00    :D?/.JHz.V?/.J?/.:
0140/320: 0602 570F FF42 672E B781 5144 EF00 044E    :..W..Bg...QD...N:
0150/336: 7500 0000 0000 0000 0000 0000 0000 0000    :u...............:
0160/352: 0000 0000 0000 0000 0000 0000 0000 0000    :................:
0170/368: 0000 0000 0000 0000 0000 0000 0000 0000    :................:
0180/384: 0000 0000 0000 0000 0000 0000 0000 0000    :................:
0190/400: 0000 0000 0000 0000 0000 0000 0000 0000    :................:
01A0/416: 0000 0000 0000 0000 0000 0000 0000 0000    :................:
01B0/432: 0000 0000 0000 0000 0000 0000 0000 0000    :................:
01C0/448: 0000 0000 0000 0000 0000 0000 0000 0000    :................:
01D0/464: 0000 0000 0000 0000 0000 0000 0000 0000    :................:
01E0/480: 0000 0000 0000 0000 0000 0000 0000 0000    :................:
01F0/496: 0000 0000 0000 0000 0000 0000 0000 0000    :................:
```

This is sector 000D (13) of file " Virtual"
It is absolute sector 37 located at track 3, sector 1

```
Tags:     0000 0002 0300 000D 9FCC 5A1D
0000/000: 0000 0000 0000 0000 0000 0000 0000 0000    :................:
0010/016: 0000 0000 0000 0000 0000 0000 0000 0000    :................:
0020/032: 0000 0000 0000 0000 0000 0000 0000 0000    :................:
0030/048: 0000 0000 0000 0000 0000 0000 0000 0000    :................:
0040/064: 0000 0000 0000 0000 0000 0000 0000 0000    :................:
0050/080: 0000 0000 0000 0000 0000 0000 0000 0000    :................:
0060/096: 0000 0000 0000 0000 0000 0000 0000 0000    :................:
0070/112: 0000 0000 0000 0000 0000 0000 0000 0000    :................:
0080/128: 0000 0000 0000 0000 0000 0000 0000 0000    :................:
0090/144: 0000 0000 0000 0000 0000 0000 0000 0000    :................:
00A0/160: 0000 0000 0000 0000 0000 0000 0000 0000    :................:
00B0/176: 0000 0000 0000 0000 0000 0000 0000 0000    :................:
00C0/192: 0000 0000 0000 0000 0000 0000 0000 0000    :................:
00D0/208: 0000 0000 0000 0000 0000 0000 0000 0000    :................:
00E0/224: 0000 0000 0000 0000 0000 0000 0000 0000    :................:
00F0/240: 0000 0000 0000 0000 0000 0000 0000 0000    :................:
0100/256: 0000 0000 0000 0000 0000 0000 0000 0000    :................:
0110/272: 0000 0000 0000 0000 0000 0000 0000 0000    :................:
0120/288: 0000 0000 0000 0000 0000 0000 0000 0000    :................:
0130/304: 0000 0000 0000 0000 0000 0000 0000 0000    :................:
0140/320: 0000 0000 0000 0000 0000 0000 0000 0000    :................:
0150/336: 0000 0000 0000 0000 0000 0000 0000 0000    :................:
0160/352: 0000 0000 0000 0000 0000 0000 0000 0000    :................:
0170/368: 0000 0000 0000 0000 0000 0000 0000 0000    :................:
0180/384: 0000 0000 0000 0000 0000 0000 0000 0000    :................:
0190/400: 0000 0000 0000 0000 0000 0000 0000 0000    :................:
01A0/416: 0000 0000 0000 0000 0000 0000 0000 0000    :................:
01B0/432: 0000 0000 0000 0000 0000 0000 0000 0000    :................:
01C0/448: 0000 0000 0000 0000 0000 0000 0000 0000    :................:
01D0/464: 0000 0000 0000 0000 0000 0000 0000 0000    :................:
01E0/480: 0000 0000 0000 0000 0000 0000 0000 0000    :................:
01F0/496: 0000 0000 0000 0000 0000 0000 0000 0000    :................:
```

This is sector 000E (14) of file " Virtual"
It is absolute sector 38 located at track 3, sector 2

```
Tags:     0000 0002 0300 000E 9FCC 5A1D
0000/000: 0000 0000 0000 0000 0000 0000 0000 0000    :................:
0010/016: 0000 0000 0000 0000 0000 0000 0000 0000    :................:
0020/032: 0000 0000 0000 0000 0000 0000 0000 0000    :................:
```

```
0030/048: 0000 0000 0000 0000 0000 0000 0000 0000    :................:
0040/064: 0000 0000 0000 0000 0000 0000 0000 0000    :................:
0050/080: 0000 0000 0000 0000 0000 0000 0000 0000    :................:
0060/096: 0000 0000 0000 0000 0000 0000 0000 0000    :................:
0070/112: 0000 0000 0000 0000 0000 0000 0000 0000    :................:
0080/128: 0000 0000 0000 0000 0000 0000 0000 0000    :................:
0090/144: 0000 0000 0000 0000 0000 0000 0000 0000    :................:
00A0/160: 0000 0000 0000 0000 0000 0000 0000 0000    :................:
00B0/176: 0000 0000 0000 0000 0000 0000 0000 0000    :................:
00C0/192: 0000 0000 0000 0000 0000 0000 0000 0000    :................:
00D0/208: 0000 0000 0000 0000 0000 0000 0000 0000    :................:
00E0/224: 0000 0000 0000 0000 0000 0000 0000 0000    :................:
00F0/240: 0000 0000 0000 0000 0000 0000 0000 0000    :................:
0100/256: 0000 0000 0000 0000 0000 0000 0000 0000    :................:
0110/272: 0000 0000 0000 0000 0000 0000 0000 0000    :................:
0120/288: 0000 0000 0000 0000 0000 0000 0000 0000    :................:
0130/304: 0000 0000 0000 0000 0000 0000 0000 0000    :................:
0140/320: 0000 0000 0000 0000 0000 0000 0000 0000    :................:
0150/336: 0000 0000 0000 0000 0000 0000 0000 0000    :................:
0160/352: 0000 0000 0000 0000 0000 0000 0000 0000    :................:
0170/368: 0000 0000 0000 0000 0000 004E 56FF F02F    :...........NV../:
0180/384: 0FA9 7608 2F00 3500 064E 5E66 0007 2A41    :..v./.5..N^f..*A:
0190/400: FAE9 EA4D FAEB E642 A800 0CA0 14A2 0766    :...M...B.......f:
01A0/416: 0007 163D 6800 4400 1A26 2800 3078 0038    :...=h.D..&(.0x.8:
01B0/432: 2800 38C8 FC02 0031 780A 5A00 1842 A800    :(.8....1x.Z..B..:
01C0/448: 1C43 FAFB 8E21 4900 1270 08A2 6066 0006    :.C...!I..p..`f..:
01D0/464: E842 A800 0C42 2800 1A11 7C00 0300 1B42    :.B...B(...|....B:
01E0/480: A800 1CA0 0066 0006 D03D 6800 1800 2E22    :.....f...=h....":
01F0/496: 7803 4ED2 E800 184A A900 0866 1A21 7C00    :x.N....J...f.!|.:

This is sector 000F (15) of file " Virtual"
It is absolute sector 39 located at track 3, sector 3

Tags:    0000 0002 0300 000F 9FCC 5A1D
0000/000: 8000 0000 24A2 1066 0006 AE21 7C00 8000    :....$..f...!|...:
0010/016: 0000 1CA0 12A0 457A 007C 003A 2900 263C    :......Ez.|.:).&<:
0020/032: 2900 284C 0350 05DA 842D 4500 1C4C 0360    :).(L.P...-E..L.`:
0030/048: 06BC A900 0865 0006 802C 2900 0822 6900    :.....e...,).."i.:
0040/064: 1430 2900 483D 4000 1831 4000 1642 A800    :.0).H=@..1@..B..:
0050/080: 0C31 7C00 0100 2C21 7C00 7EF8 0000 2031    :.1|...,!|.~... 1:
0060/096: 6E00 1A08 1821 7C00 0008 0000 2448 7A00    :n....!|.....$Hz.:
0070/112: 123F 3C00 023F 3C00 03A8 953F 3C00 02A8    :.?<..?<....?<...:
0080/128: 9546 FC27 004A B801 2067 1420 3C00 0001    :.F.'.J.. g. <...:
0090/144: 4041 FAEB 2091 9041 FAEB 1EE4 8891 5041    :@A.. ..A......PA:
00A0/160: FAE7 DA22 7C00 0840 0030 3C05 BF22 D851    :..."|..@.0<..".Q:
00B0/176: C8FF FC20 3801 084C 7C00 0000 0010 0024    :... 8..L|......$:
00C0/192: 4942 9951 C8FF FC2A 3801 0820 054C 7C00    :IB.Q...*8.. .L|.:
00D0/208: 0000 0010 0038 0006 4000 2004 4400 2272    :.....8..@. .D."r:
00E0/224: 0122 7C00 0800 0022 C106 8100 0008 0051    :."|....".......Q:
00F0/240: C8FF F620 0690 854C 7C00 0000 0008 0053    :... ...L|......S:
0100/256: 8042 9951 C8FF FC30 0422 C106 8100 0008    :.B.Q...0."......:
0110/272: 0051 C8FF F678 1F26 7C00 0804 0020 0604    :.Q...x.&|.... ..:
0120/288: 8000 0100 004C 7C00 0000 0002 0006 8000    :.....L|.........:
0130/304: 0800 0022 4020 06E2 8804 8000 0100 004C    :..."@ .........L:
0140/320: 7C00 0000 0002 0006 8000 0800 0020 4020    :|............ @ :
0150/336: 0420 D122 D342 9B08 E900 08FF FE51 C8FF    :. .".B.......Q..:
0160/352: F220 9342 9330 0422 7C00 0800 0008 E900    :. .B.0."|.......:
0170/368: 0800 0258 8951 C8FF F622 7C00 0800 0070    :...X.Q..."|....p:
0180/384: 3F08 E900 0A00 0258 8951 C8FF F620 0604    :?......X.Q... ..:
```

```
0190/400:  8000 0100 0090 85D0 B801 0C4C 7C00 0000     :...........L|...:
01A0/416:  0002 0006 8000 07FF FC02 40FF FC22 4008     :..........@.."@.:
01B0/432:  E900 0A00 0258 89B3 FC00 083F FC63 F07A     :.....X.....?.c.z:
01C0/448:  0B76 FF78 2020 064C 7C00 0000 0008 0053     :.v.x  .L|......S:
01D0/464:  8022 7C00 0800 0022 1967 1A08 0100 0866     :."|...."g.....f:
01E0/480:  0E08 0100 0A66 08EA A935 8412 0060 06EA     :.....f...5...`..:
01F0/496:  A935 8312 0051 C8FF E022 7C00 0800 0008     :.5...Q..."|.....:
```

This is sector 0010 (16) of file " Virtual"
It is absolute sector 40 located at track 3, sector 4

```
Tags:      0000 0002 0300 0010 9FCC 5A1D
0000/000:  E900 0500 03D2 FC3F FC08 E900 0500 0320     :.......?........:
0010/016:  3C00 7F80 0061 00F6 8804 8000 7700 0022     :<....a......w..":
0020/032:  4008 E900 0500 0323 F800 0800 0843 8821     :@......#.....C.!:
0030/048:  FC00 7F43 B000 0821 FC00 7F42 000D BC20     :...C...!...B... :
0040/064:  7C00 7F42 5E30 3CA0 5DA2 4741 FAE8 2E70     :|..B^0<.].GA...p:
0050/080:  004E 902C 7801 081E 3801 2F26 380D 0038     :.N.,x...8./&8..8:
0060/096:  380D A641 F801 0043 F80C B04E B940 8002     :8..A...C...N.@..:
0070/112:  2041 F80C BC43 F81E 004E B940 8002 202C     : A...C...N.@.. ,:
0080/128:  7C00 8000 0021 CE01 0811 C701 2F21 C30D     :|....!....../!..:
0090/144:  0031 C40D A64D FA00 084E F940 8020 5021     :.1...M...N.@. P!:
00A0/160:  FC00 7F42 000D BC21 FC57 4C53 430C FC42     :...B...!.WLSC..B:
00B0/176:  B801 204E B940 8002 DE21 FC00 7EF8 0001     :.. N.@...!..~...:
00C0/192:  0C46 FC27 0070 0120 780D BC4E 9020 7C50     :.F.'.p. x..N. |P:
00D0/208:  F020 0011 7C00 021C 004E B940 8003 004E     :. ..|....N.@...N:
00E0/224:  B940 8004 B64E B940 800D 0A70 002F 0820     :.@...N.@...p./. :
00F0/240:  780D BC4E 9020 5F20 7C00 7F42 5E30 3CA0     :x..N. _ |..B^0<.:
0100/256:  5DA2 474E B940 8004 784E B940 800E 044E     :].GN.@..xN.@...N:
0110/272:  B940 8002 3E4E B940 8004 644E B940 800E     :.@..>N.@..dN.@..:
0120/288:  224E B940 800E 804E B940 8002 CA4E B940     :"N.@...N.@...N.@:
0130/304:  800E 3246 FC20 004E B940 806D 804E B940     :...2F. .N.@.m.N.@:
0140/320:  8007 E620 4F22 7801 0C2C 7801 080C B857     :... O"x..,x....W:
0150/336:  4C53 430C FC67 064E B940 802B BC4E B940     :LSC..g.N.@.+.N.@:
0160/352:  8002 302E 4890 FC20 00A0 2D43 F803 084E     :...0.H.. ..-C...N:
0170/368:  B940 8060 724E B940 8266 364E B940 800D     :.@.`rN.@.f6N.@..:
0180/384:  9E4E B940 800B B820 7802 A620 50D0 FC40     :.N.@... x.. P..@:
0190/400:  00A0 5720 7802 A621 C801 1821 C802 AA21     :..W x..!...!...!:
01A0/416:  D001 144D EF04 004B EF01 9020 7C50 F020     :...M...K... |P. :
01B0/432:  0011 7C00 821C 004E B940 8002 7C21 FC57     :..|....N.@..|!.W:
01C0/448:  4C53 430C FC4E B940 8015 1C20 7802 A621     :LSC..N.@... x..!:
01D0/464:  C801 1821 C802 AA21 D001 1412 2E00 060C     :...!...!........:
01E0/480:  0100 4467 0A02 0100 C00C 0100 C066 044E     :..Dg.........f.N:
01F0/496:  AE00 0230 2E00 7CA0 6D30 2E00 7AA0 6C41     :...0..|.m0..z.lA:
```

This is sector 0011 (17) of file " Virtual"
It is absolute sector 41 located at track 3, sector 5

```
Tags:      0000 0002 0300 0011 9FCC 5A1D
0000/000:  EEFC 0031 7802 1000 16A0 0F67 064E F940     :...1x......g.N.@:
0010/016:  8011 AE42 A800 1242 6800 1CA2 0766 0E28     :...B...Bh....f.(:
0020/032:  6800 5E20 2800 5A4E B940 8012 7643 F80A     :h.^ (.ZN.@..vC..:
0030/048:  D841 EE00 0A70 10A0 2E55 4F42 B80A F2A9     :.A...p...UOB....:
0040/064:  954A 5F6A 1041 EEFC 0042 A800 12A0 0E4E     :.J_j.A...B.....N:
0050/080:  F940 8011 AE70 004E B940 8011 E02A 0066     :.@...p.N.@...*.f:
0060/096:  047E 0060 0620 4521 D002 BAA8 FE42 6748     :.~.`. E!.....BgH:
0070/112:  6E00 4AA9 9736 1F0C 43FF FF67 5042 A742     :n.J..6..C..gPB.B:
0080/128:  67A9 BC20 1F67 4224 40A0 2920 522F 2800     :g.. .gB$@.) R/(.:
0090/144:  062F 2800 0241 EEFE 024A 6800 046A 0420     :./(..A...Jh..j. :
```

```
00A0/160: 5020 5048 6800 0648 6F00 044E B940 8012    :P PHh..Ho..N.@..:
00B0/176: 984E B940 8018 A42F 0A48 6F00 04A8 F650    :.N.@.../.Ho....P:
00C0/192: 8F3F 03A9 9A51 C760 603F 03A9 9A43 EE00    :.?...Q.``?...C..:
00D0/208: 4A76 014E B940 8012 0656 C766 4C2F 3C01    :Jv.N.@...V.fL/<.:
00E0/224: 5602 0042 A73F 3C00 4048 6E08 0045 EEFE    :V..B.?<.@Hn..E..:
00F0/240: 024A 6A00 046A 0424 5224 522F 3C01 5602    :.Jj..j.$R$R/<.V.:
0100/256: 0042 A748 6A00 0648 6F00 044E B940 8012    :.B.Hj..Ho..N.@..:
0110/272: 9848 6F00 082F 0A48 6F00 1648 6F00 0C42    :.Ho../.Ho..Ho..B:
0120/288: 6742 A7A8 ECDE FC00 164A 0767 064E B940    :gB.......J.g.N.@:
0130/304: 8018 A470 284E B940 8011 D804 B800 0004    :...p(N.@........:
0140/320: 0001 0C43 EE00 2A4E B940 8012 0467 0A06    :...C..*N.@...g..:
0150/336: B800 0004 0001 0C60 204E 9170 F64E B940    :.......` N.p.N.@:
0160/352: 8011 D843 EE00 3A4E B940 8012 0466 0A4E    :...C..:N.@...f.N:
0170/368: 9170 F54E B940 8011 D843 F80A D876 FF4E    :.p.N.@...C...v.N:
0180/384: B940 8012 0666 164E 9148 E780 8020 7C00    :.@...f.N.H... |.:
0190/400: 7F42 5E30 3CA0 5DA2 474C DF01 014E F940    :.B^0<.].GL...N.@:
01A0/416: 8010 3822 7900 7F43 0822 1908 0100 0066    :..8"y..C.".....f:
01B0/432: F859 8920 7C00 7F3F 7C22 1002 41FC 0022    :.Y. |..?|"..A..":
01C0/448: 8123 C900 7F43 0020 7C00 7F42 5E30 3CA0    :.#...C. |..B^0<.:
01D0/464: 5DA2 4720 7C00 7F48 D04E 9061 0000 CE30    :].G |..H.N.a...0:
01E0/480: 3CA0 02A1 4623 C800 7F43 8020 7C00 7F4D    :<...F#...C. |..M:
01F0/496: A030 3CA0 02A0 4730 3CA0 03A1 4623 C800    :.0<...G0<...F#..:

This is sector 0012 (18) of file " Virtual"
It is absolute sector 42 located at track 3, sector 6

Tags:       0000 0002 0300 0012 9FCC 5A1D
0000/000: 7F43 8420 7C00 7F4F FE30 3CA0 03A0 472F    :.C. |..O.0<...G/:
0010/016: 3C00 7F42 723F 3C00 083F 3C00 03A8 9520    :<..Br?<..?<.... :
0020/032: 7C00 7FFD 0042 A042 6021 1F42 604E 672E    :|....B.B`!.B`Ng.:
0030/048: 4891 C822 7C00 7F80 0022 D822 D822 3C00    :H.."|...."."."<.:
0040/064: 7F52 9230 3C00 3D22 C151 C8FF FC20 3C00    :.R.0<.="..Q... <.:
0050/080: 0001 0042 9951 C8FF FC30 3CA9 FFA1 4623    :...B.Q..0<...F#:
0060/096: C800 7F43 8C23 FC00 7F43 B000 7F80 0823    :...C.#...C.....#:
0070/112: FC00 7F50 7C00 7F80 2023 FC00 7F52 1400    :...P|... #...R..:
0080/128: 7F80 2423 FC00 7F50 4600 7F80 2823 FC00    :..$#...PF...(#..:
0090/144: 7F42 6C00 7F80 7C22 7C00 7F80 004E 7B98    :.Bl...|"|....N(.:
00A0/160: 0121 F900 7F43 8800 084E 733F 3CF0 203F    :.!...C...Ns?<. ?:
00B0/176: 3CFF FF61 0E4E 753F 3CF0 303F 3CFF FF61    :<..a.Nu?<.0?<..a:
00C0/192: 024E 754E 5600 002F 0B42 A72F 3C49 434E    :.NuNV../.B./<ICN:
00D0/208: 233F 2E00 0AA9 A020 1F67 2020 40A0 2926    :#?..... .g  @.)&:
00E0/224: 482F 103F 2E00 084E BA00 1420 4BA0 2A2F    :H/.?...N... K.*/:
00F0/240: 08A9 A326 5F4E 5E2E 9F4E 7560 F64E 56FD    :...&_N^..Nu`.NV.:
0100/256: 5C48 E73F 1C4B EEFD 5C48 6EFE F8A8 6E48    :\H.?.K..\Hn...nH:
0110/272: 6EFF 00A8 7448 6EFF 04A8 6F30 3809 2CE3    :n...tHn...o08.,.:
0120/288: 580A 4010 21B0 7809 2E67 180C B850 6175    :X.@.!.x..g...Pau:
0130/304: 6C0A 7867 0831 FC00 0809 2C60 0631 F80A    :l.xg.1....,`.1..:
0140/320: 7E09 2C41 EEFF 0430 2800 0C04 4000 2848    :~.,A...0(...@.(H:
0150/336: 4030 3809 2C2D 40FF F82D 40FF FC06 6E00    :@08.,-@..-@...n.:
0160/352: 20FF FE06 6E00 20FF FC26 6E00 0A61 3630    : ...n. ..&n..a60:
0170/368: 3809 2C32 2E00 086A 0432 3C00 28D0 4131    :8.,2...j.2<.(.A1:
0180/384: C009 2CE3 580A 4010 2131 C009 2E48 6EFF    :..,.X.@.!1...Hn.:
0190/400: 04A8 7D2F 2EFF 00A8 734C DF38 FC4E 5E20    :..}/....sL.8.N^ :
01A0/416: 5F5C 8F4E D049 EEFF DC28 8B06 9400 0000    :_\.N.I...(......:
01B0/432: 8039 7C00 0400 0442 AC00 0629 7C00 2000    :.9|....B...)|. .:
01C0/448: 2000 0A2F 0C45 EEFF 0448 6A00 0248 7A00    : ../.E...Hj..Hz.:
01D0/464: 2C48 6EFF F83F 3C00 0342 A7A8 EC04 9400    :,Hn..?<..B......:
01E0/480: 0000 802F 0C48 6A00 0248 7A00 1048 6EFF    :.../.Hj..Hz..Hn.:
01F0/496: F83F 3C00 0142 A7A8 EC4E 7500 0000 0000    :.?<..B...Nu.....:
```

This is sector 0013 (19) of file " Virtual"
It is absolute sector 43 located at track 3, sector 7
Logical End Of File is after position 017F(383) in this sector

```
Tags:      0000 0002 8300 0013 9FCC 6431
0000/000:  2000 2000 0000 9E3F 302E 3930 2056 6972    : .....?0.90 Vir:
0010/016:  7475 616C 204D 656D 6F72 7920 4F70 6572    :tual Memory Oper:
0020/032:  6174 696E 6720 5379 7374 656D 2049 6E69    :ating System Ini:
0030/048:  7469 616C 697A 6572 2066 6F72 2074 6865    :tializer for the:
0040/064:  204D 6163 2049 492E 2020 436F 7079 7269    : Mac II.  Copyri:
0050/080:  6768 7420 3139 3838 2C20 436F 6E6E 6563    :ght 1988, Connec:
0060/096:  7469 7820 436F 7270 6F72 6174 696F 6E2E    :tix Corporation.:
0070/112:  2020 5772 6974 7465 6E20 6279 204A 6F6E    :  Written by Jon:
0080/128:  6174 6861 6E20 462E 2047 6172 6265 722E    :athan F. Garber.:
0090/144:  2041 6C6C 2072 6967 6874 7320 7265 7365    : All rights rese:
00A0/160:  7276 6564 2E00 0001 0000 0026 A500 0025    :rved.......&...%:
00B0/176:  A500 0000 DB00 6A1E 9804 0C00 0000 1C00    :......j.........:
00C0/192:  D600 0756 4D45 4D00 0000 4246 5245 4600    :...VMEM...BFREF.:
00D0/208:  0000 4E42 4E44 4C00 0000 5A49 434E 2300    :..NBNDL...ZICN#.:
00E0/224:  0200 6649 4E49 5400 0000 8A53 4552 2300    :..fINIT....SER#.:
00F0/240:  0000 9641 4C52 5400 0000 A244 4954 4C00    :...ALRT....DITL.:
0100/256:  0000 AE00 00FF FF00 0025 0300 0000 00F0    :........%.......:
0110/272:  20FF FF00 0000 0000 0000 00F0 20FF FF00    : ............ ..:
0120/288:  0000 0B00 0000 00F0 30FF FF20 0000 2B00    :........0.. ..+.:
0130/304:  0000 00FF 80FF FF20 0001 2F00 0000 00F0    :....... ../.....:
0140/320:  20FF FF20 0002 3300 0000 0000 0A00 0000    : .. ..3.........:
0150/336:  0004 7700 0000 0000 08FF FF00 0003 3700    :..w...........7.:
0160/352:  6A8D 8802 9AFF FF00 0003 4300 0000 0002    :j.........C.....:
0170/368:  9AFF FF00 0003 5300 0000 0004 4D61 696E    :......S.....Main:
0180/384:  0000 0000 0000 0000 0000 0000 0000 0000    :................:
0190/400:  0000 0000 0000 0000 0000 0000 0000 0000    :................:
01A0/416:  0000 0000 0000 0000 0000 0000 0000 0000    :................:
01B0/432:  0000 0000 0000 0000 0000 0000 0000 0000    :................:
01C0/448:  0000 0000 0000 0000 0000 0000 0000 0000    :................:
01D0/464:  0000 0000 0000 0000 0000 0000 0000 0000    :................:
01E0/480:  0000 0000 0000 0000 0000 0000 0000 0000    :................:
01F0/496:  0000 0000 0000 0000 0000 0000 0000 0000    :................:
```

I claim:

1. A method of utilizing physical memory and peripheral storage in an Apple MacIntosh computer running under an Apple Macintosh operating system, wherein the Apple Macintosh computer includes a suitable microprocessor capable of coacting with memory management logic either internal or external to the microprocessor, and an amount of physical memory, and wherien the Apple Macintosh computer is capable of operating in both user and supervisor modes, as virtual memory comprising the steps of:

allocating a portion of the peripheral storage as a virtual memory file, determining the amount of the physical memory resident in the Apple Macintosh computer, setting the memory management logic to address at least part of the physical memory and at least part of the virtual memory file as virtual memory space, whereby there is a first portion of the virtual memory space in the physical memory and a second portion of the virtual memory space in the peripheral storage, establishing a supervisor stack in the physical memory, reconfiguring the Apple Macintosh computer to continue processing, normally performed in supervisor mode, in the user mode, including establishing at least one user stack in the virtual memory space in response to an attempt by the Apple Macintosh operating system to establish a stack and forcing the Apple Macintosh operating system or at least one currently executing application program to use the at least one user stack instead of the supervisor stack as if the Apple Macintosh operating system or the at least one currently executing application program was still operating in the normal supervisor mode by redirecting the microprocessor to use the at least one user stack when the Apple Macintosh operating system or the at least one currently executing application program attempts to address any stack during processing normally performed in supervisor mode, and swapping between the first and second portions of the virtual memory space, in accordance with a predetermined criteria, non-critical information.

2. The method of claim 1 further including the step of retaining critical information in the first portion of the virtual memory space.

3. The method of claim 2 wherein critical information includes at least the location of the supervisor stack.

4. The method of claim 3 further including the steps of switching to supervisor mode to perform the information swapping step.

5. The method of claim 1 further including the step of organizing the virtual memory space into pages, and wherein the predetermined criteria includes consideration of page usage history.

6. The method of claim 2 further including the step of causing the macintosh operating system to recognize the entire virtual memory space as available physical memory by rebotting the Apple Macintosh computer, after allocating the virtual memory file and setting the memory management logic, without resetting the memory management logic or critical memory configuration values.

7. The invention of claim 1 further including the step of retaining the supervisor stack in a known location in the physical memory.

8. The invention of claim 6 wherein oen of the critical memory configuration values is the value of MEM-TOP.

9. The invention of claim 6 wherein one of the critical memory configuration values is the initial value of BUFPTR.

10. A method of installing virtual memory comprising a combination of physical memory and peripheral storage in an Apple Macintosh computer capable of operating in privileged and protected modes running under an Apple Macintosh operating system wherein the Apple Macintosh computer includes a suitable microprocessor capable of coacting with memory management logic either internal or external to the microprocessor, and an amount of physical memory, comprising the steps of:
   allocating a portion of the peripheral storage as a block,
   setting the memory management logic to address at least a portion of the physical memry and at least a portion of the block of the peripheral storage as virtual memory space,
   reconfiguring the Macintosh operating system without further resetting the memory management logic to cause the Macintosh operating system to recognize the virtual memory space as available physical memory nd to cause the Apple Macintosh computer to continue processing, normally performed in priviledged mode, in the protected mode, including establishing at least one user stack in the virtual memory space in response to an attempt by the Macintosh operating system to establish a stack and forcing the Macintosh operating system or at least one currently executing application program to use the at least one user stack as if the macintosh operating system or the at least one currently executing application program was still operating in normal privileged mode by redirecting the microprocessor to use the at least one user stack when the Macintosh operating system or the at least one currently executing application program attempts to address any stack during processing normally performed in privileged mode.

11. A method of utilizing physical memory and peripheral storage in a computer system running under an operating system, wherein the computer system includes a suitable microprocessor capable of coacting with memory management logic either internal or external to the microprocessor, and an amount of physical memory, and wherein the computer system is capable of operating in both user and supervisor modes, as virtual memory comprising the steps of:
   allocating a portion of the peripheral storage as a virtual memory file,
   determining the amount of the physical memory resident in the computer system,
   setting the memory management logic to address at least part of the physical memory and at least part of the virtual memory file as virtual memory space, whereby there is a first portion of the virtual memory space in the physical memory and a second portion of the virtual memory space in the peripheral storage,
   establishing a supervisor stack in the physical memory,
   reconfiguring the computer system to continue processing, normally performed in supervisor mode, in the user mode, including establishing at least one user stack in the virtual memory space in response to an attempt by the operating system to establish a stack and forcing the operating system or at least one currently executing application program to use the at least one user stack instead of the supervisor stack as if the operating system or the at least one currently executing application program was still operating in the normal supervisor mode by redirecting the microprocessor to use the at least one user stack when the operating system or the at least one currently executing application program attempts to address any stack during processing normally performed in supervisor mode, and
   swapping between the first and second portions of the virtual memory space, in accordance with a predetermined criteria, non-critical information.

* * * * *